US012643251B2

(12) United States Patent  
McDermott

(10) Patent No.: US 12,643,251 B2  
(45) Date of Patent: Jun. 2, 2026

(54) ELECTROSTATIC VERTICAL PLY STORAGE

(71) Applicant: The Boeing Company, Chicago, IL (US)

(72) Inventor: Christopher Robert McDermott, Williams Landing (AU)

(73) Assignee: The Boeing Company, Arlington, VA (US)

( * ) Notice: Subject to any disclaimer, the term of this patent is extended or adjusted under 35 U.S.C. 154(b) by 760 days.

(21) Appl. No.: 18/054,050

(22) Filed: Nov. 9, 2022

(65) Prior Publication Data

US 2024/0150134 A1 May 9, 2024

(51) Int. Cl.
| | |
|---|---|
| *B26D 7/01* | (2006.01) |
| *B64F 5/10* | (2017.01) |
| *B65G 47/92* | (2006.01) |
| *B65G 49/06* | (2006.01) |
| *H02N 13/00* | (2006.01) |

(52) U.S. Cl.
CPC ............... *B26D 7/015* (2013.01); *B64F 5/10* (2017.01); *B65G 47/92* (2013.01); *B65G 49/061* (2013.01); *B65G 49/062* (2013.01); *H02N 13/00* (2013.01)

(58) Field of Classification Search
CPC .......... B32B 2037/1063; B65G 49/061; B65G 47/92; B65G 49/062; B26D 7/015; B64F 5/10; B64C 1/12; B64C 3/26; B65H 2701/172; B65H 2301/44334; B65H 2301/5132; B65H 2301/5322; B65H 3/18; B65H 5/004; B29C 41/006; B29C 2045/14106; B29C 48/9165; B29C 2049/2447; B29C 2049/2466; B29C 63/0043; B29C 65/008; B29C 65/7852; B29C 70/38; H02N 13/00
See application file for complete search history.

(56) References Cited

U.S. PATENT DOCUMENTS

| | | | |
|---|---|---|---|
| 4,342,268 | A | 8/1982 | Grava |
| 4,424,902 | A | 1/1984 | Silinsky et al. |
| 4,657,146 | A | 4/1987 | Walters |
| 5,031,782 | A | 7/1991 | Minervini |
| 5,375,959 | A | 12/1994 | Trento |
| 5,850,924 | A | 12/1998 | Borter |
| 7,217,077 | B2 | 5/2007 | Mercure |
| 7,264,126 | B1 | 9/2007 | Bergeron |
| 7,733,666 | B2 | 6/2010 | Ichihara et al. |
| 9,969,131 | B2 * | 5/2018 | Samak Sangari .... B25J 15/0085 |
| 10,106,294 | B2 | 10/2018 | Böttcher |
| 10,633,171 | B2 | 4/2020 | Mader |
| 2012/0000866 | A1 | 1/2012 | Huszczo et al. |
| 2013/0199954 | A1 | 8/2013 | Huard et al. |

(Continued)

FOREIGN PATENT DOCUMENTS

| | | |
|---|---|---|
| CA | 2766287 A1 | 7/2013 |
| CN | 106314942 A | 1/2017 |

(Continued)

*Primary Examiner* — Jeremy R Severson  
(74) *Attorney, Agent, or Firm* — Yee & Associates, P.C.

(57) ABSTRACT

A method, apparatus, and system for storing a carbon fiber ply. The carbon fiber ply is moved to an electrostatic storage panel. The carbon fiber ply is attached to the electrostatic storage panel using an electrostatic charge generated by the electrostatic storage panel.

25 Claims, 17 Drawing Sheets

(56)  References Cited

U.S. PATENT DOCUMENTS

| | | |
|---|---|---|
| 2013/0284638 A1 | 10/2013 | Hsiao et al. |
| 2021/0221625 A1 | 7/2021 | Hotger et al. |

FOREIGN PATENT DOCUMENTS

| | | |
|---|---|---|
| CN | 109383926 A | 2/2019 |
| DE | 946742 C1 | 8/1956 |
| DE | 4300822 C2 | 8/1995 |
| DE | 4405782 A1 | 8/1995 |
| DE | 202013102068 U1 | 6/2013 |
| DE | 102013104883 A1 | 11/2014 |
| EP | 0793933 A1 | 9/1997 |
| EP | 3103744 A1 | 12/2016 |
| JP | 2006123943 A | 5/2006 |
| JP | 4839556 B2 | 12/2011 |
| KR | 101385953 B1 | 4/2014 |
| WO | 2014087766 A1 | 6/2014 |

* cited by examiner

START

500 ⎯ MOVE THE COMPOSITE PLY TO AN ELECTROSTATIC STORAGE PANEL

502 ⎯ ATTACHING THE COMPOSITE PLY TO THE ELECTROSTATIC STORAGE PANEL USING AN ELECTROSTATIC CHARGE GENERATED BY THE ELECTROSTATIC STORAGE PANEL

END

START

600 ⎯ DETACH THE COMPOSITE PLY FROM THE ELECTROSTATIC STORAGE PANEL

602 ⎯ MOVE THE COMPOSITE PLY TO A FINAL PLACEMENT LOCATION

END

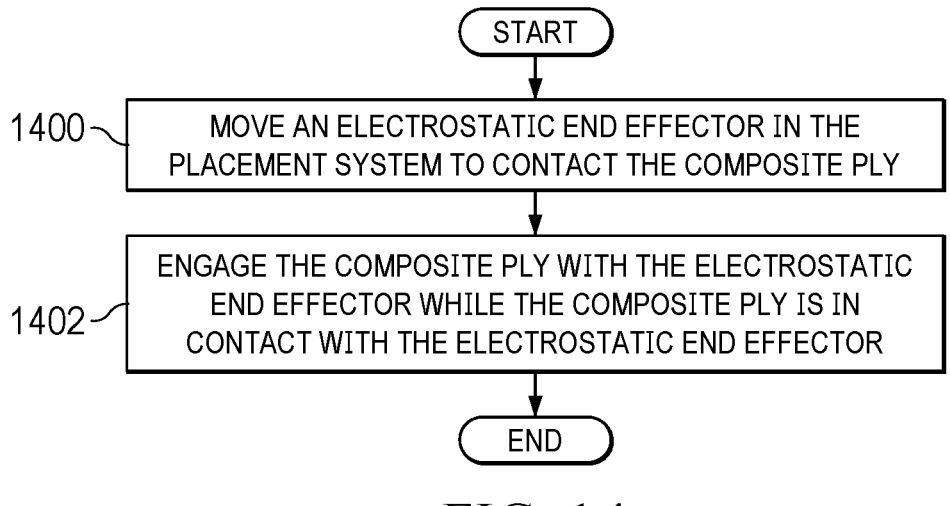

START

1400 ⌐ MOVE AN ELECTROSTATIC END EFFECTOR IN THE PLACEMENT SYSTEM TO CONTACT THE COMPOSITE PLY

1402 ⌐ ENGAGE THE COMPOSITE PLY WITH THE ELECTROSTATIC END EFFECTOR WHILE THE COMPOSITE PLY IS IN CONTACT WITH THE ELECTROSTATIC END EFFECTOR

END

FIG. 14

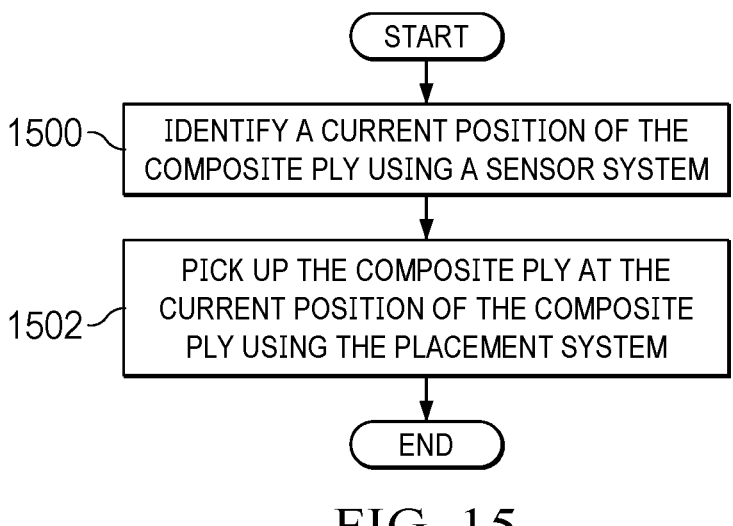

START

1500 ⌐ IDENTIFY A CURRENT POSITION OF THE COMPOSITE PLY USING A SENSOR SYSTEM

1502 ⌐ PICK UP THE COMPOSITE PLY AT THE CURRENT POSITION OF THE COMPOSITE PLY USING THE PLACEMENT SYSTEM

END

FIG. 15

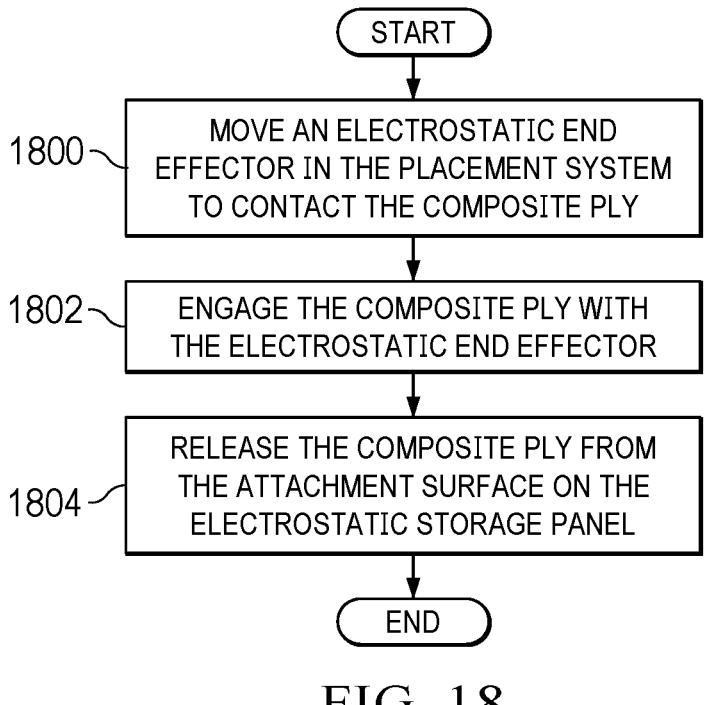

START

1800 — MOVE AN ELECTROSTATIC END EFFECTOR IN THE PLACEMENT SYSTEM TO CONTACT THE COMPOSITE PLY

1802 — ENGAGE THE COMPOSITE PLY WITH THE ELECTROSTATIC END EFFECTOR

1804 — RELEASE THE COMPOSITE PLY FROM THE ATTACHMENT SURFACE ON THE ELECTROSTATIC STORAGE PANEL

END

FIG. 18

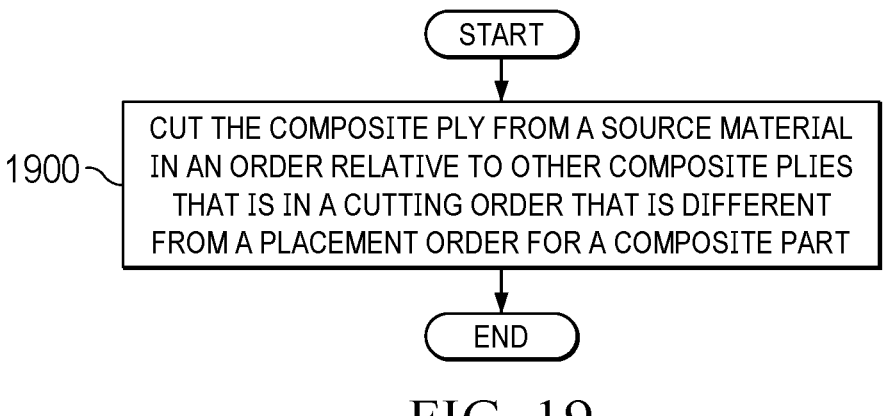

START

1900 — CUT THE COMPOSITE PLY FROM A SOURCE MATERIAL IN AN ORDER RELATIVE TO OTHER COMPOSITE PLIES THAT IS IN A CUTTING ORDER THAT IS DIFFERENT FROM A PLACEMENT ORDER FOR A COMPOSITE PART

END

FIG. 19

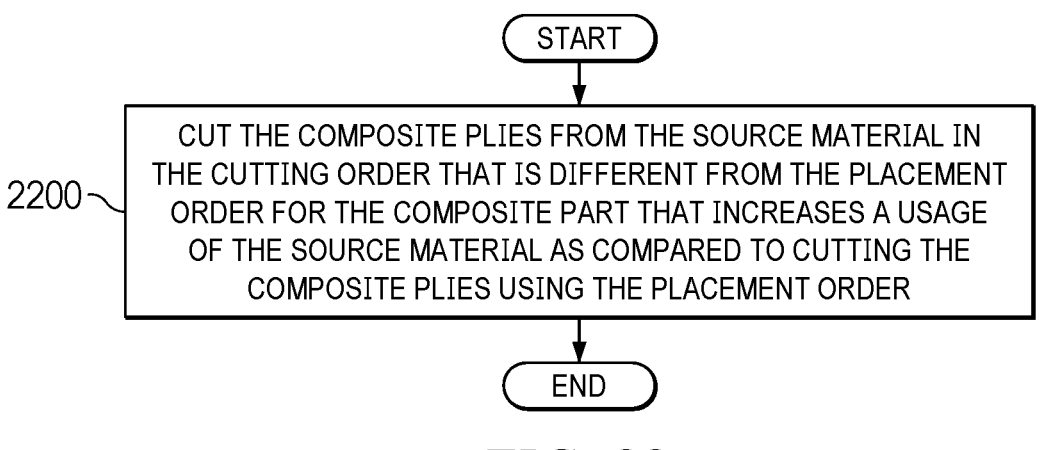

2200

START

CUT THE COMPOSITE PLIES FROM THE SOURCE MATERIAL IN THE CUTTING ORDER THAT IS DIFFERENT FROM THE PLACEMENT ORDER FOR THE COMPOSITE PART THAT INCREASES A USAGE OF THE SOURCE MATERIAL AS COMPARED TO CUTTING THE COMPOSITE PLIES USING THE PLACEMENT ORDER

END

FIG. 22

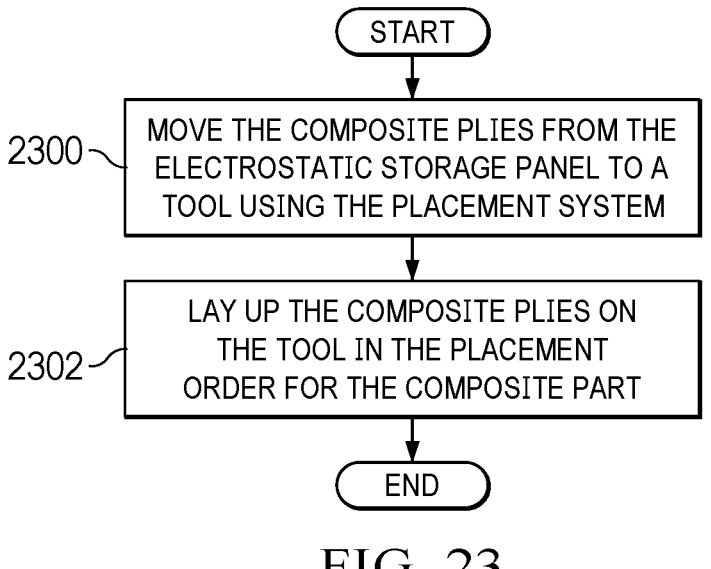

START

2300

MOVE THE COMPOSITE PLIES FROM THE ELECTROSTATIC STORAGE PANEL TO A TOOL USING THE PLACEMENT SYSTEM

2302

LAY UP THE COMPOSITE PLIES ON THE TOOL IN THE PLACEMENT ORDER FOR THE COMPOSITE PART

END

2602 — SPECIFICATION AND DESIGN

2604 — MATERIAL PROCUREMENT

2606 — COMPONENT AND SUBASSEMBLY MANUFACTURING

2608 — SYSTEM INTEGRATION

2610 — CERTIFICATION AND DELIVERY

2612 — IN SERVICE

2614 — MAINTENANCE AND SERVICE

2700

AIRCRAFT

2702 — AIRFRAME    INTERIOR — 2706

SYSTEMS

PROPULSION SYSTEM    ELECTRICAL SYSTEM 2708    2712    2710    2714

HYDRAULIC SYSTEM    ENVIRONMENTAL SYSTEM

2704

ELECTROSTATIC VERTICAL PLY STORAGE

BACKGROUND INFORMATION

1. Field

The present disclosure relates generally to manufacturing composite structures and in particular, to a method, system, and apparatus for storing carbon fiber plies used to manufacture composite structures.

2. Background

Composite materials comprised of carbon fiber can be dry or in a prepreg form in which a resin is infused into the carbon fiber material. These composite materials can take the form of composite plies. These plies can be cut into desired shapes and laid up on a tool. The composite plies laid up on the tool can be cured to form a composite part.

This process of forming a composite part involves numerous steps in which a ply is handled. A human operator can place a composite fabric in a work area such as a cutter flatbed. A cutter can cut the composite fabric to form composite plies having shapes with desired dimensions. When the size of the cut is large, a human operator or multiple human operators remove a composite ply from the scrap material and transport the composite ply to another location for further processing or storage. This process can involve rolling and folding the composite ply when acceptable. The composite ply can be placed on a tool in which the boundaries of the ply are aligned to laser projections.

As another example, in a cutting cell, plies can be automatically cut for layup to for a composite part. A robotic arm can place these plies in drawers for storage until the composite plies are needed to fabricate the composite part. A robotic arm picks up the composite plies from the drawers and places the composite plies in a specified order on a tool. The composite plies can be cured to form the composite part.

SUMMARY

An embodiment of the present disclosure provides a method for storing a carbon fiber ply. The carbon fiber ply is moved to an electrostatic storage panel. The carbon fiber ply is attached to the electrostatic storage panel using an electrostatic charge generated by the electrostatic storage panel. According to other illustrative embodiments, a computer system and a computer program product for storing a carbon fiber ply are provided.

Another embodiment of the present disclosure provides a method for storing a composite ply. The composite ply is moved to an electrostatic storage panel using a placement system. The method causes the composite ply to contact an attachment surface on the electrostatic storage panel using the placement system. The composite ply is engaged with the attachment surface on the electrostatic storage panel through an electrostatic charge generated by the electrostatic storage panel in response to the composite ply contacting the attachment surface of the electrostatic storage panel. The composite ply is released from the placement system in response to the composite ply being engaged with the attachment surface on the electrostatic storage panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a flowchart of a process for picking up a composite ply using a placement system in accordance with an illustrative embodiment;

FIG. 15 is an illustration of a flowchart of a process for picking up a composite ply using a placement system in accordance with an illustrative embodiment;

FIG. 18 is an illustration of a flowchart of a process for picking up a composite ply from an attachment surface on an electrostatic storage panel in accordance with an illustrative embodiment;

FIG. 19 is an illustration of a flowchart of a process for cutting a composite ply from a source material in accordance with an illustrative embodiment;

FIG. 22 is an illustration of a flowchart of a process for cutting composite plies from a source material in accordance with an illustrative embodiment;

FIG. 23 is an illustration of a flowchart of a process for laying up composite plies on a tool in accordance with an illustrative embodiment;

DETAILED DESCRIPTION

The illustrative embodiments recognize and take into account one or more different considerations as described herein. For example, the illustrative embodiments recognize and take into account that current storage for carbon fiber plies often take the form of drawers or tables. The carbon fiber plies are stored in a horizontal orientation. Drawers take up floor space.

Additionally, the use of drawers can introduce contaminants. For example, drawers can have mechanical actuated movement. These mechanical parts and actuators have lubricants. As a result, stacking drawers can result in contamination of the carbon fiber plies. For example, a risk is present that lubricant on bearings in one drawer can drip on carbon fiber plies in a lower drawer. As a result, designing and constructing large drawer systems for storing carbon fiber plies can be more expensive than desired.

Additionally, a drawer unit may not always move to the same spot when opened and closed without high tolerance machining. As a result, errors may be present in accurately positioning carbon fiber plies for automated layup. Additionally, plies within a drawer can shift positions which also introduce errors for accurately positioning the carbon fiber. Using a vacuum system within the drawers to hold plies in place results in noise pollution that can be an issue in a composite manufacturing environment.

One solution involves using tables. However, tables take up expensive floorspace and can only hold one carbon fiber ply or a set of one type of carbon fiber plies.

The illustrative examples can employ a vertical storage system. This vertical storage system can avoid the use of vacuum and the associated noise through the use of adhesion or attraction between composite plies and an attachment surface on a vertical storage board using an electrostatic charge generated by the vertical storage board. In this illustrative example, the vertical storage board can use electrostatic adhesion to hold and store composite plies.

In one illustrative example, the process can be implemented to store a composite ply such as a carbon fiber ply. The carbon fiber ply can be moved to an electrostatic storage panel. The electrostatic storage panel is vertically oriented in a composite part manufacturing system. The carbon fiber ply is attached to the electrostatic storage panel using an electrostatic charge generated by the electrostatic storage panel. The carbon fiber ply is vertically oriented while attached to the electrostatic storage panel.

Figure 1:
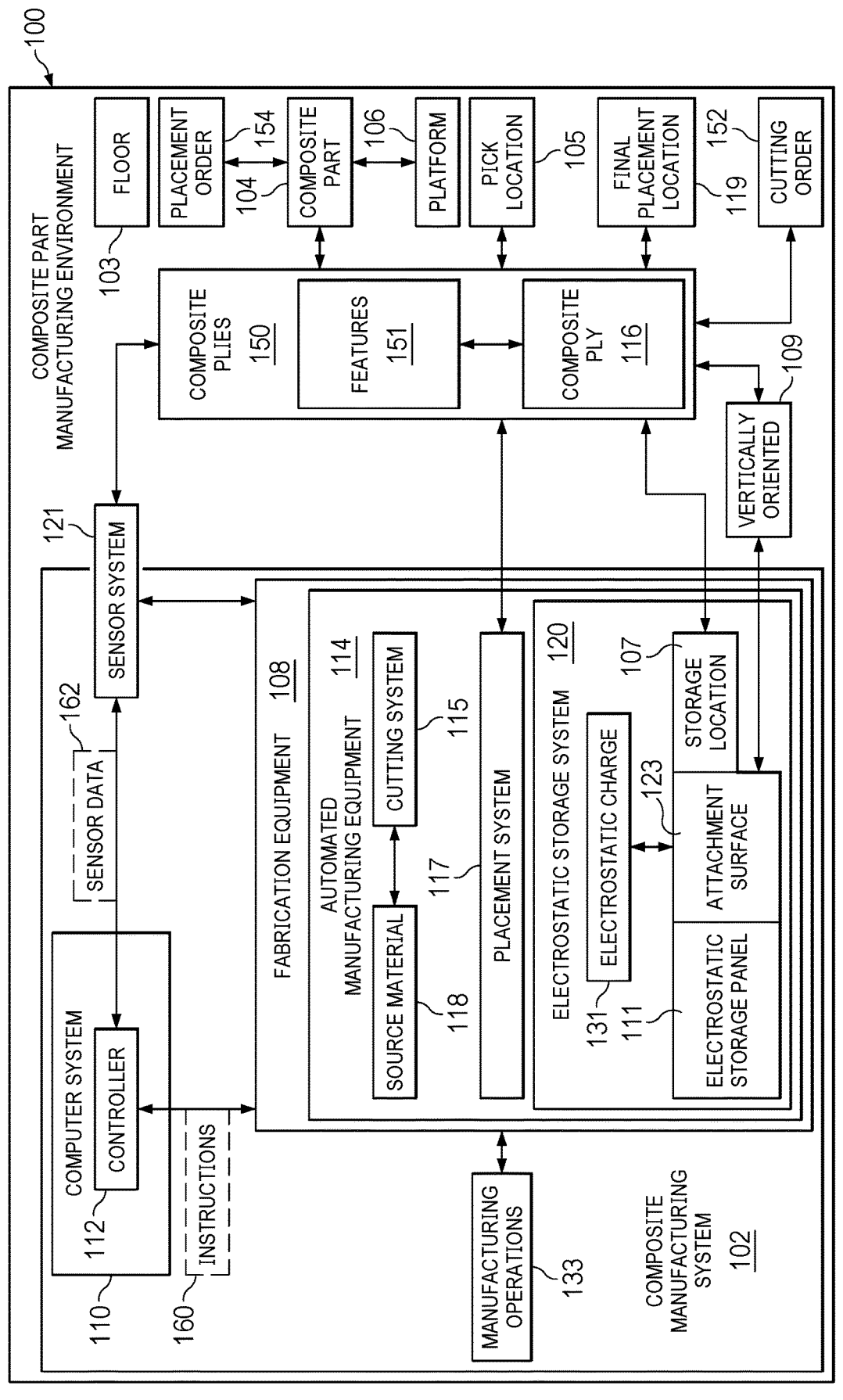
FIG. 1 is an illustration of a block diagram of a composite part manufacturing environment in accordance with an illustrative embodiment.

With reference to the figures in particular with reference to FIG. 1, an illustration of a block diagram of composite part manufacturing environment is depicted in accordance with an illustrative embodiment. Composite part manufacturing environment 100 includes composite manufacturing system 102, which can operate to manufacture composite part 104 for platform 106.

In this illustrative example, platform 106 can take a number of different forms. For example, platform 106 can be selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building, other suitable types of platforms.

Composite part 104 for platform 106 can also take a number of different forms. For example, composite part 104 can be selected from at least one of a skin panel, a stringer, a wing, a wing box, a nacelle, a fuselage section, a door, a panel, a control surface, a vertical stabilizer, a horizontal stabilizer, a rudder, an elevator, an aileron, a vehicle hood, a wall panel, a pipe, a composite sandwich panel, and other suitable types of composite parts for use in platform 106.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, composite manufacturing system 102 comprises a number of different components. As depicted, composite manufacturing system 102 includes fabrication equipment 108, computer system 110, and controller 112.

Controller 112 is located in computer system 110 in this example. Controller 112 can control the operation of fabrication equipment 108 and can be implemented in software, hardware, firmware or a combination thereof. When software is used, the operations performed by controller 112 can be implemented in program instructions configured to run on hardware, such as a processor unit. When firmware is used, the operations performed by controller 112 can be implemented in program instructions and data and stored in persistent memory to run on a processor unit. When hardware is employed, the hardware can include circuits that operate to perform the operations in controller 112.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations.

Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 110 is a physical hardware system and includes one or more data processing systems. When more than one data processing system is present in computer system 110, those data processing systems are in communication with each other using a communications medium. The communications medium can be a network. The data processing systems can be selected from at least one of a computer, a server computer, a tablet computer, or some other suitable data processing system.

Fabrication equipment 108 is physical equipment and can include physical machines or devices that can be used to perform operations in manufacturing composite part 104. In this illustrative example, fabrication equipment 108 can include automated manufacturing equipment 114. Automated manufacturing equipment 114 is a hardware system and can include software. Automated manufacturing equipment 114 can perform tasks without needing input or instructions from a human operator. Automated manufacturing equipment 114 can include circuits such as a processor unit, an application specific integrated circuit (ASIC), or other hardware that is configured or designed to enable performance of the tasks. This hardware can be programmable and can be, for example, a computer numeric control (CNC) machine.

For example, automated manufacturing equipment 114 can be a physical system such as cutting system 115 that cuts source material 118 to form composite plies 150. Source material 118 can be, for example, a fabric or other layer of material that can be cut to form composite plies 150. In this illustrative example, a composite ply in composite plies 150 is a composite material comprising fibers and resins that have not been finally cured or consolidated to form composite part 104.

Composite plies 150 can be comprised of fibers in which resin can be infused and, for example, cured to form composite part 104. In the illustrative examples, one or more of composite plies 150 can already have resin infused such that composite plies 150 can be layers of prepreg or unimpregnated dry fibers.

Fibers in composite plies 150 can be, for example, carbon fibers. Other fibers that can be used in addition to or in place of the carbon fibers, include at least one of fiberglass fibers, para-aramid fibers, aramid fibers, or other suitable fibers that can be used to form composite ply 116. Composite ply 116 can be one of a prepreg or unimpregnated dry fibers.

Cutting system 115 can comprise one or more cutting machines that have one or more cutters. A cutter in cutting system 115 can be, for example, an electric oscillating knife, an ultrasonic knife, a laser cutter, a kit cutting machine, a drag knife, a driven rotary blade, or other suitable type of machine that can be automated to cut composite ply 116.

As another example, automated manufacturing equipment 114 can include placement system 117 that operates to move or position composite ply 116 in composite plies 150. In this illustrative example, a placement system 117 can be, for example, a gantry, a pick and place robot, a robotic arm with an end effector, or other type of placement device.

In this illustrative example, fabrication equipment 108 also includes electrostatic storage system 120. Electrostatic storage system 120 comprises an electrostatic storage panel 111 that is vertically oriented 109 with respect to floor 103 in composite part manufacturing environment 100. In this illustrative example, electrostatic storage panel 111 can operate to store composite ply 116 such that composite ply 116 is vertically oriented 109.

In one illustrative example, controller 112 can operate placement system 117 to move composite ply 116 from pick location 105 to storage location 107 on attachment surface 123 on electrostatic storage panel 111.

In one illustrative example, pick location 105 can be at cutting system 115 that cuts composite ply 116 from source material 118. In this example, placement system 117 can pick up composite ply 116 at pick location 105 after composite ply 116 has been cut from source material 118 by cutting system 115.

Placement system 117 can operate to attach composite ply 116 to electrostatic storage panel 111 at storage location 107 storage location 107 on attachment surface 123 using electrostatic charge 131 generated by electrostatic storage panel 111.

For example, controller 112 can control electrostatic storage panel 111 to generate electrostatic charge 131 on attachment surface 123 of electrostatic storage panel 111, wherein composite ply 116 becomes attached to attachment surface 123 of electrostatic storage panel 111 in response to contacting attachment surface 123.

In this example, composite ply 116 is vertically oriented while attached to the electrostatic storage panel 111. Thus, composite ply 116 can be stored on electrostatic storage panel 111 using less real estate as compared to current drawer systems or tables.

In this illustrative example, controller 112 can also control placement system 117 to detach composite ply 116 from electrostatic storage panel 111. Placement system 117, controlled by controller 112, can move composite ply 116 from storage location 107 to final placement location 119.

In this illustrative example, final placement location 119 is a location in which further processing of composite ply 116 can be performed. For example, final placement location 119 can be selected from one of a tool, a mandrel, a storage unit, a prior placed composite ply for a laminate, or some other suitable location where composite ply 116 will be laid up, infused with resin, or otherwise processed.

In this illustrative example, the movement of composite ply 116 from pick location 105, to electrostatic storage panel 111, and to final placement location 119 is performed with desired levels of precision through indexing composite ply 116 within composite part manufacturing environment 100.

For example, the indexing of composite ply 116 can be performed using sensor system 121. In this illustrative example, sensor system 121 can generate sensor data 162 about fabrication equipment 108 including automated manufacturing equipment 114, the environment around fabrication equipment 108, composite ply 116, and other objects in composite part manufacturing environment 100.

Sensor system 121 can include sensors selected from at least one of camera system, a laser sensor, an ultrasonic sensor, a light detection and ranging scanner, an encoder, a rotary encoder, a temperature sensor, a pressure sensor, an accelerometer, or some other suitable type of sensor. These sensors can be distributed throughout composite part manufacturing environment 100. For example, one or more sensors can be located on at least one of cutting system 115, placement system 117, electrostatic storage system 120, or in other locations on or near fabrication equipment 108.

In this example, controller 112 can index a position of composite ply 116 using a set of features 151 for the composite ply 116. Features 151 can be for example, at least one of a fiducial marker, a shape of composite ply 116. The fiducial marker can be attached to or formed on composite ply 116. The position can be indexed to at least one of a device or object such as a cutter or an end effector.

Sensor data 162 can be sent to controller 112. Controller 112 can use sensor data 162 to generate instructions 160 to control the operation of fabrication equipment 108.

As depicted, controller 112 performs the set of manufacturing operations 133 by sending instructions 160 to fabrication equipment 108 in which instructions 160 are executable by fabrication equipment 108 to cause fabrication equipment 108 to perform manufacturing operations 133 on composite ply 116. These manufacturing operations can include, for example, cutting source material 118 using cutting system 115 to form composite ply 116, moving composite ply 116 using placement system 117, holding composite ply 116 on attachment surface 123 of electrostatic storage panel 111, and other suitable manufacturing operations.

In this illustrative example, instructions 160 can be program code, commands, electrical signals, or other types of instructions that can be used by fabrication equipment 108 to perform manufacturing operations 133.

In one illustrative example, controller 112 can control cutting system 115 to cut composite plies 150 from source material 118 in a manner that increases the usage of source material 118. In other words, controller 112 can control cutting system 115 to cut composite plies 150 in a manner that increase the amount of source material 118 that results in composite plies. In one illustrative example, controller 112 can control cutting system 115 to cut composite plies 150 from source material 118 in cutting order 152 that is different from placement order 154 for composite part 104.

For example, cutting system 115 can cut composite ply 116 from source material 118 in an order relative to other composite plies in composite plies 150 that is in cutting order 152 that is different from placement order 154 of composite plies for composite part 104. In this example, cutting composite plies 150 from source material 118 in cutting order 152 that is different from placement order 154 for composite part 104 can increase a usage of source material 118 from which composite plies 150 are cut as compared cutting composite plies 150 using placement order 154 for composite part 104.

Thus, one or more illustrative examples can reduce a problem with current horizontal storage systems for composite plies. In one illustrative example, the use of vertical oriented electrostatic storage panels for storage can reduce the amount of floor space or real estate needed to store composite panels as compared to using drawers or tables. Reducing the amount of real estate can reduce the cost for manufacturing facilities.

In another illustrative example, the use of a vertically oriented electrostatic storage panel can reduce the amount of movement that occurs with composite plies currently stored in drawers. For example, the opening of a drawer, the placement of a composite ply in the drawer and the closing of the drawer is avoided with an electrostatic storage panel in a vertical orientation. Additional movement of opening the door to remove the composite panel is also avoided through the use of the electrostatic storage panel. Potential issues with a composite ply sliding in response to movement of the drawer is avoided. As result, errors in positioning composite plies caused by unknown or unmeasured movement of the composite plies in drawers can be reduced. Additionally, issues with contaminants such as lubricants used for moving parts such a bearings or actuators in current drawers for storage are avoided.

Additionally, in another illustrative example composite plies can be cut in a cutting order that increases the use of source materials reducing the amount of source material that is discarded as compared to current techniques in which composite plies are cut in a placement order. In yet other illustrative examples, increased accuracy in the placement of composite parts can occur when composite plies are stored on electrostatic storage panels in vertical orientations. Reduced movement also occurs on the composite plies as compared to using drawers because drawers need to be opened and closed for storage.

The illustration of composite part manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more electrostatic storage panels can be present in addition to electrostatic storage panel 111 in electrostatic storage system 120. In another illustrative example, automated manufacturing equipment 114 may omit cutting system 115 in some examples.

In another example, fabrication equipment 108 can include other equipment other than cutting system 115, placement system 117, and electrostatic storage system 120. For example, fabrication equipment 108 can include an automated tape layup (ATL) system, a prepreg system, a tool, a mandrel, a lathe, and other fabrication equipment. As another example, fabrication equipment 108 can include one or more electrostatic storage panels that are vertically oriented in addition to or in place of electrostatic storage panel 111.

Figure 2:
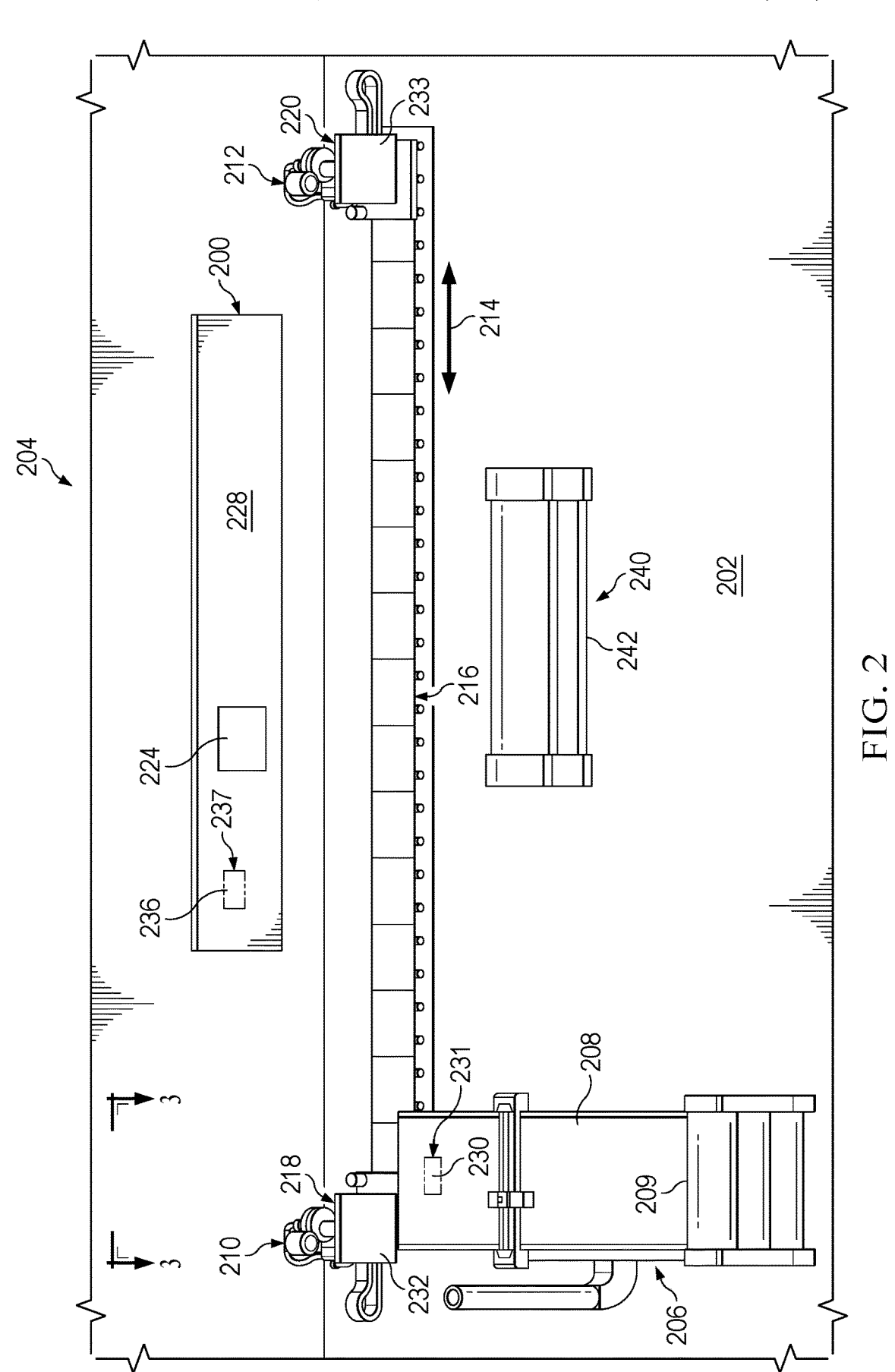
FIG. 2 is an illustration of a cell containing a vertically oriented electrostatic storage panel in accordance with an illustrative embodiment.

Turning next to FIG. 2, an illustration of a cell containing a vertically oriented electrostatic storage panel is depicted in accordance with an illustrative embodiment. In this illustrative example, electrostatic storage panel 200 is an example of electrostatic storage panel 111 in FIG. 1. As depicted, electrostatic storage panel 200 is vertically oriented with respect to floor 202 in cell 204. In this illustrative example, cell 204 is a location where composite plies can be laid up for a composite part such as a spar, a rib, a skin panel, or other composite part.

In this illustrative example, electrostatic storage panel 200 is substantially perpendicular to floor 202. In this example, manufacturing cell 204 is an area in a composite part manufacturing environment such as composite part manufacturing environment 100.

In this illustrative example, cutting machine 206 is a fabric cutter and is an example of a cutting machine in cutting system 115. Cutting machine 206 can cut source material in the form of fabric 208 from fabric roll 209 to form composite plies in the form of composite fiber plies.

In this example, robotic arm 210 and robotic arm 212 are a set of robotic arms that are examples of placement devices in placement system 117 in FIG. 1. As depicted, robotic arm 210 and robotic arm 212 can move in the direction of arrow 214 along track 216. In this illustrative, robotic arm 210 has end effector 218 and robotic arm 212 has end effector 220. End effector 218 and end effector 220 can be, for example, an electrostatic end effector using an electrostatic charge to adhere the ply to the end effector or a vacuum end effector using a vacuum to adhere a ply to the end effector.

As depicted in this example, composite ply 224 is attached to attachment surface 228 on electrostatic storage panel 200. The attachment of these composite plies occurs from an electrostatic charge generated by electrostatic storage panel 200 that causes composite ply 224 to become engaged with attachment surface 228. In the illustrative example this engagement can be electroadhesion. Electroadhesion is the electrostatic effect of astriction between two surfaces subjected to an electrical field. In this example, the two surfaces are the composite ply surface and attachment surface 228.

As depicted in this example, robotic arm 210 can pick composite ply 230 using end effector 218. In this illustrative example, end effector 218 has electrostatic gripper 232. Electrostatic gripper 232 is a device similar to electrostatic storage panel 200 that can operate to hold composite ply 230 by generating an electrostatic charge. As depicted, composite ply 230 can be picked up by electrostatic gripper 232 on end effector 218 from pick location 231 on cutting machine 206.

Robotic arm 210 can move composite ply 230 and electrostatic storage panel 200 can cause composite ply 230 to contact attachment surface 228 at storage location 236 on an attachment surface 228. In this example, storage location 236 for composite ply 230 on electrostatic storage panel 200 is shown by dashed line 237.

Electrostatic storage panel 200 can engage composite ply 230 with attachment surface 228 in response to composite ply 230 contacting attachment surface 228 of electrostatic storage panel 200. In this illustrative example, engagement between composite ply 230 and electrostatic storage panel 200 occurs when composite ply 230 becomes attached to attachment surface 228 because of the electrostatic charge causing electrostatic attraction between composite ply 230 and electrostatic storage panel 200 such that composite ply 230 becomes attached to electrostatic storage panel 200.

Electrostatic gripper 232 on end effector 218 can release composite ply 230 in response to composite ply 230 becoming engaged with attachment surface 228 on electrostatic storage panel 200. In this illustrative example, electrostatic gripper 232 can release composite ply 230 at storage location 236 by reversing the charge to release composite ply 230 more quickly as compared to turning off the power to electrostatic gripper 232.

In this illustrative example, robotic arm 212 can move along track 216 towards storage location 236. Robotic arm 212 can pick up composite ply 230 at storage location 236 with electrostatic gripper 233 on end effector 220. Robotic arm 212 can move composite ply 230 to final location 240 on mandrel 242. For example, robotic arm 212 can move end effector 220 and place composite ply 230 on mandrel 242 at final location 240. In this illustrative example, final location 240 can have coordinates for global axis system (G) 308 in FIG. 3.

Figure 3:
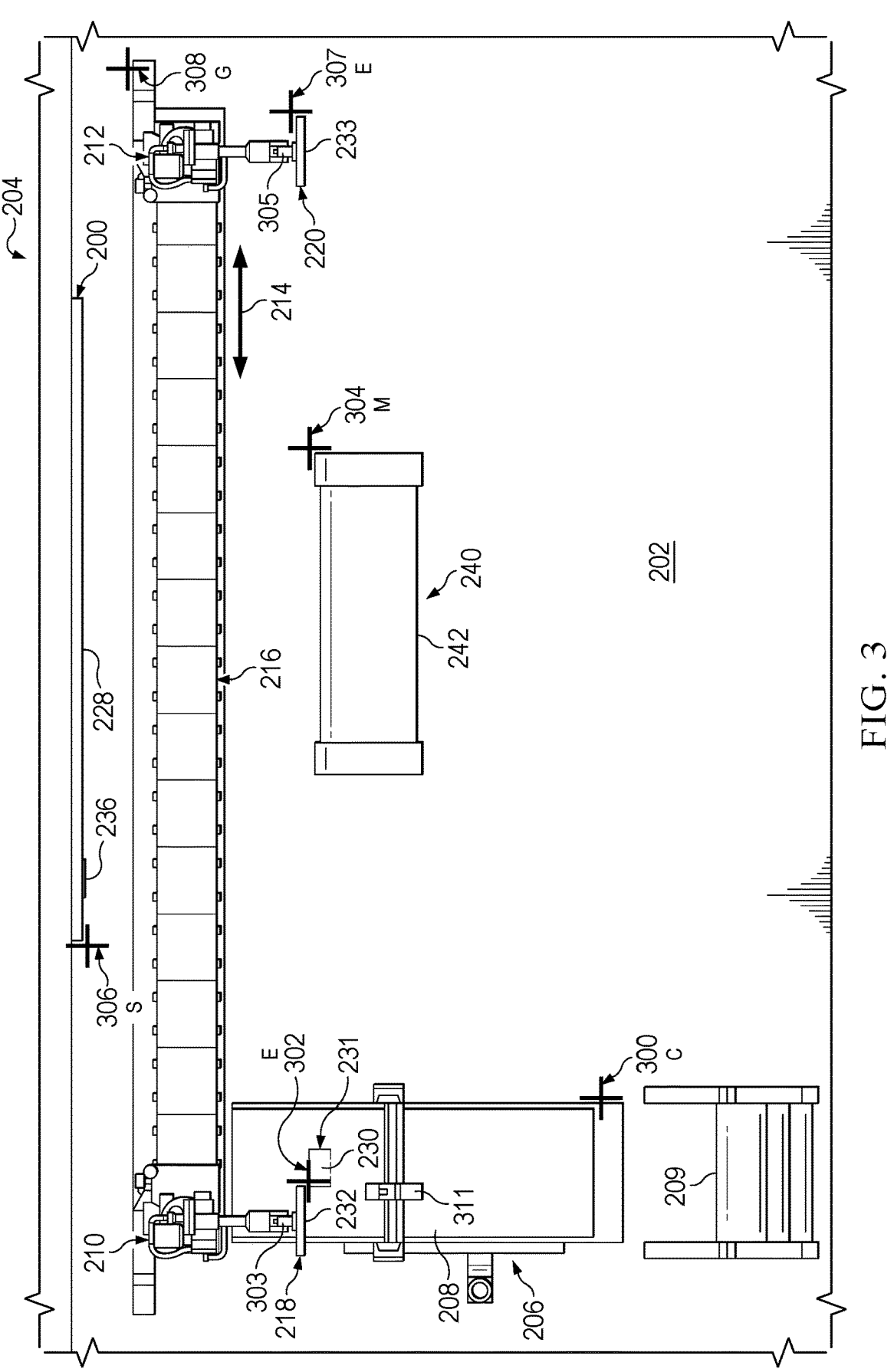
FIG. 3 is an illustration of a top view of the cell in accordance with an illustrative embodiment.

With reference next to FIG. 3, an illustration a top view of the cell is depicted in accordance with an illustrative embodiment. In this illustrative example, top view of cell 204 is seen in direction of lines 3-3 in FIG. 2.

In this illustrative example, axis systems present in cell 204 are used move a composite ply are depicted. As depicted, the axis systems in cell 204 are cutter axis system (C) 300 for cutting machine 206, end effector axis system (E) 302 for end effector 218 on robotic arm 210, end effector axis system (E) 307 for end effector 220 on robotic arm 212, mandrel axis system (M) 304 for mandrel 242, storage axis system (S) 306 for electrostatic storage panel 200, and global axis system (G) 308.

In this illustrative example, cutter axis system (C) 300, end effector axis system (E) 307 for end effector 220 on robotic arm 212, mandrel axis system (M) 304, and storage axis system (S) 306 are aligned with global axis system (G) 308. In other words, coordinates for position in any one of cutter axis system (C) 300, end effector axis system (E) 307, mandrel axis system (M) 304, and storage axis system (S) 306 can be translated into the coordinates for can be translated into the coordinates for global axis system (G) 308. As are result these components can be described in coordinates for global axis system (G) 308.

For example, locations on mandrel 242 are described in coordinates using mandrel axis system (M) 304. When mandrel 242 is placed in cell 204, mandrel axis system (M) 304 can be aligned with global axis system (G) 308. If mandrel 242 is moved within cell 204, a realignment of mandrel axis system (M) 304 with global axis system (G) 308 can be performed.

This alignment results in an ability to describe locations on mandrel 242 using coordinates in global axis system (G) 308. In a similar fashion, the axis systems for other components can be aligned with global axis system (G) 308 such that the description of positions of these other components can be made using coordinates in global axis system (G) 308.

In this illustrative example, composite ply 230 is indexed to pick location 231. In other words, the position of composite ply 230 is determined at pick location 231.

In one example, the position of composite ply 230 can be where composite ply 230 is located in three dimensions after cutting composite ply 230 using cutting machine. In this example, pick location 231 has known coordinates in cutter axis system (C) 300.

For example, one or more fiducial markers can be placed or formed on composite ply 230. These fiducial markers can be used to determine coordinates for composite ply 230. The fiducial markers can be attached to composite ply 230. In another example, a shape of composite ply 230 can be used.

In another illustrative example, the position of composite ply 230 can also include an orientation of composite ply 230. In this example, the orientation can be values indicating that composite ply 230 is horizontal relative to floor 202 in cell 204.

In this example, indexing of composite ply 230 identifies the position of composite ply 230 at pick location 231 using cutter axis system (C) 300. Once indexed, composite ply 230 can be picked up and moved based on the position of composite ply 230 at pick location 231.

For example, composite ply 230 can be picked up by robotic arm 210. In this example, robotic arm 210 can move end effector 218 to pick up composite ply 230. This movement can be directed using a sensor such as camera 303 on end effector 218. End effector 218 on robotic arm 210 can use images generated by camera 303 to transform or translate the coordinates describing the position of composite ply 230 at pick location 231 from cutter axis system (C) 300 to coordinates in global axis system (G) 308.

With this axis system translation, position of composite ply 230 can be described using coordinates in global axis system (G) 308. Other components involved in handling composite ply 230 can have their axis systems translated into global axis system (G) 308. As a result, Global axis system (G) 308 can be used for positioning different objects in cell 204.

In this illustrative example, robotic arm 210 can translate the position of composite ply 230 from using cutter axis system (C) 300 to global axis system (G) 308. In other words, the movement of robotic arm 210 can be performed using coordinates in global axis system (G) 308.

Robotic arm 210 can move composite ply 230 and place composite ply in storage location 236 on attachment surface 228 of electrostatic storage panel 200. In this example, storage location 236 can be in coordinates for global axis system (G) 308. With the presence of an electrostatic charge generated by electrostatic storage panel 200, composite ply 230 becomes attached to attachment surface 228. In this example, the position of composite ply 230 can also include an orientation indicating that composite ply 230 is vertically oriented.

When composite ply 230 is needed for layout, robotic arm 212 can move to pick up composite ply 230 from storage location 236. For example, robotic arm 212 can move and position end effector 220 such that composite ply 230 becomes attached to electrostatic gripper 233 at storage location 236. This positioning can be performed using images generated by camera 305 on end effector 220 and knowing the coordinates of composite ply 230 at storage location 236. In this example, the coordinates are also in coordinates for global axis system (G) 308.

In this example, electrostatic storage panel 200 can turn off or generate a negative charge to release composite ply 230 from storage location 236. Robotic arm 212 can move composite ply 230 from storage location 236 to final location 240 on mandrel 242. At final location 240, robotic arm 212 can release composite ply 230 from electrostatic gripper 233 on end effector 220 such that composite ply 230 is placed at final location 240. With the indexing of composite ply 230, composite ply 230 can be in a desired position at final location 240. In other words, with the desired position at final location 240 of composite ply 230 can have coordinates that are three-dimensional coordinates for a position and an orientation that is within a specified tolerance on mandrel 242.

The illustration of electrostatic storage panel 200, cutting machine 206, robotic arm 210, robotic arm 212 in cell 204 in FIG. 2 and FIG. 3 are depicted for purposes of illustrating one manner in which automated manufacturing equipment 114 in FIG. 1 can be implemented. This illustration is not meant to limit the manner in which other illustrative examples can be implemented.

For example, in another implementation, a single robotic arm can be present. For example, robotic arm 210 can be present while robotic arm 212 is omitted. In this example, robotic arm 212 can perform both moving composite plies to electrostatic storage panel 200 for storage and moving composite plies to mandrel 242.

In another illustrative example, one or both robotic arm 210 and robotic arm 212 can be used and the end effectors can have other types of mechanisms for picking up composite plies other than electrostatic grippers. For example, a vacuum attachment system can be implemented in at least one of end effector 218 or end effector 220 in place of an electrostatic gripper.

In still another illustrative example, the final location for the composite plies can be a conveyor belt that moves the composite plies to another area for further processing. In yet another illustrative example, global axis system (G) 308 can be for a location other than cell 204. For example, global axis system (G) 308 can be an axis system for a building in which cell 204 is located or some other area or environment that can be defined by structures or arbitrarily defined.

Figure 4:
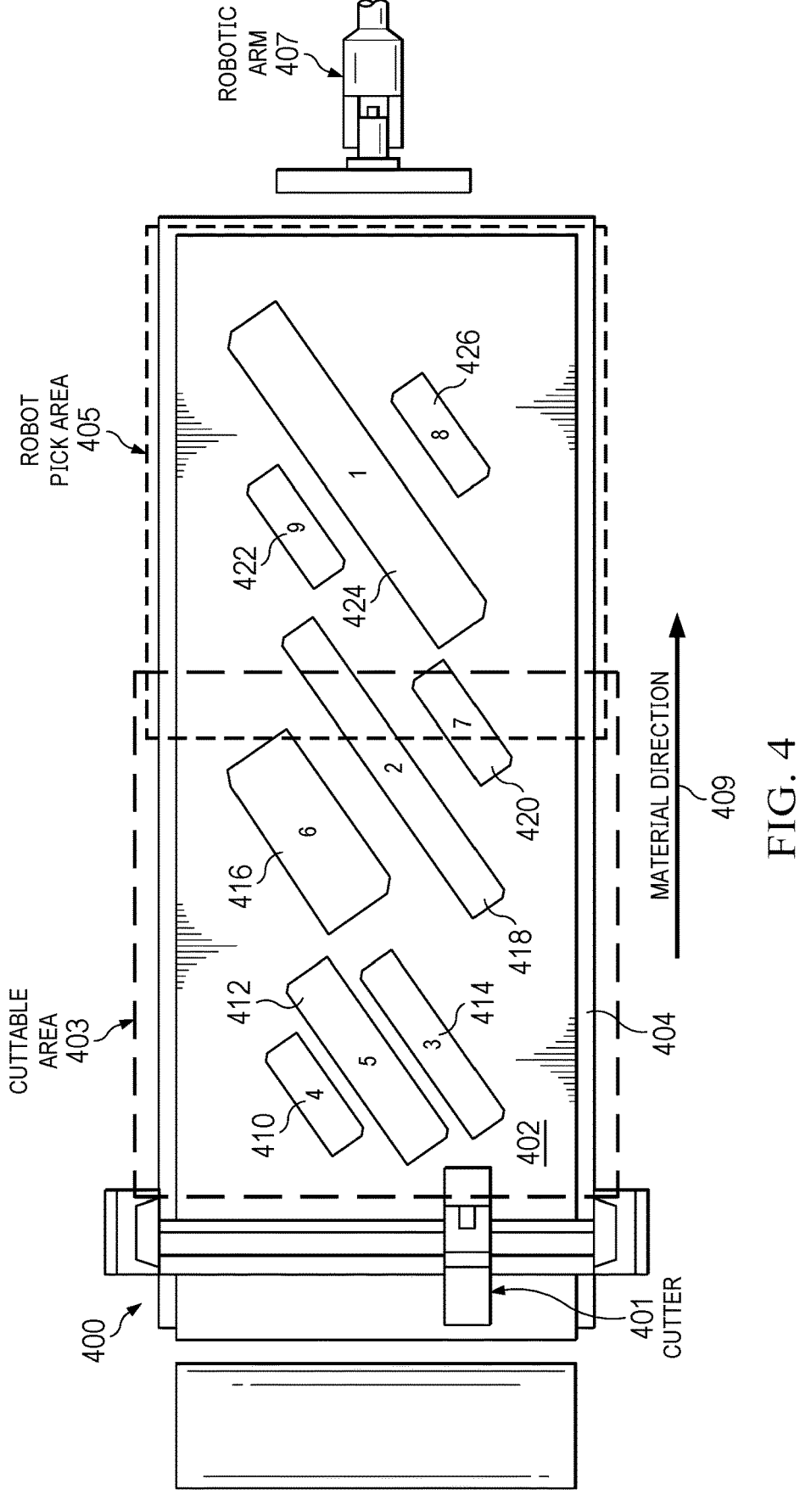
FIG. 4 is an illustration of composite plies cut from a source material in accordance with an illustrative embodiment.

Turning now to FIG. 4, an illustration of composite plies cut from a source material is depicted in accordance with an illustrative embodiment. As depicted, top view of cutting machine 400 is depicted in this figure. Cutting machine 400 is an example of an implementation for a cutting machine and cutting system 115 in FIG. 1. In this example, cutter 401 can cut source material in the form of composite fabric 402 in cuttable area 403. Cuttable area 403 is area that can be reached by cutter 401. In this example, robotic pick area 405 is an area in which robotic arm 407 can reach to pickup composite plies cut from composite fabric 402 and move composite plies in material direction 409.

As depicted, composite plies have been cut from composite fabric 402 on table 404 of cutting machine 400 by cutter 401. As depicted, the plies comprise composite ply 4 410, composite ply 5 412, composite ply 3 414, composite ply 6 416, composite ply 2 418, composite ply 7 420, composite ply 9 422, composite ply 1 424, and composite ply 8 426.

In this illustrative example, the placement order of the plies are as follows: composite ply 1 424, composite ply 2 418, composite ply 3 414, composite ply 4 410, composite ply 5 412, composite ply 6 416, composite ply 7 420, composite ply 8 426, and composite ply 9 422. This placement order can also be referred to as a layup sequence or layup order.

Currently, plies are cut in the order of placement. In other words, cutting machine 400 with cut composite ply 1 424, composite ply 2 418, composite ply 3 414 through composite ply 9 422. In this example, this order of cutting composite plies results in wasting composite fabric 402. By cutting the composite plies in the order of placement, more unused fabric occurs, resulting in a less efficient use of source material because of the shape and dimensions of the plies in this example.

However, the composite plies can be cut in a cutting order that is different from the placement order. This cutting can be selected to increase the usage of composite fabric 402 as compared to cutting the composite plies using the placement order. In other words, an increased number of plies can be cut out of the same area of composite fabric 402 when the cutting order is based on efficiency or increasing usage of composite fabric 402 rather than based on the placement order of the plies.

For example, cutting machine 400 can cut plies in an order other than placement order that results in increased use of composite fabric 402. For example, cutting machine 400 can cut composite ply 9 422, composite ply 1 424, composite ply 8 426. Cutting machine 400 can then cut composite ply 6 416, composite ply 2 418, and composite ply 7 420.

Cutting machine 400 can then cut composite ply 4 410, composite ply 5 412, and composite ply 3 414 in composite fabric 402.

Figure 5:
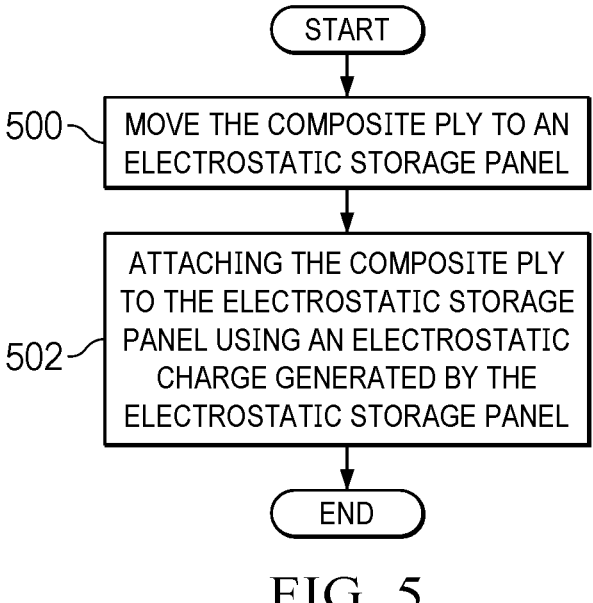
FIG. 5 is an illustration of a flowchart of a process for storing a composite ply in accordance with an illustrative embodiment.

Turning next to FIG. 5, an illustration of a flowchart of a process for storing a composite ply is depicted in accordance with an illustrative embodiment. The process in FIG. 5 can be implemented in hardware, software, or both. When implemented in software, the process can take the form of program instructions that is run by one of more processor units located in one or more hardware devices in one or more computer systems. For example, the process can be implemented in controller 112 in computer system 110 in FIG. 1.

The process begins by moving the composite ply to an electrostatic storage panel (operation 500). In operation 500, the electrostatic storage panel is vertically oriented in a composite part manufacturing system.

The process attaches the composite ply to the electrostatic storage panel using an electrostatic charge generated by the electrostatic storage panel (operation 502). In operation 502, the composite ply is vertically oriented while attached to the electrostatic storage panel. The process terminates thereafter.

Figure 6:
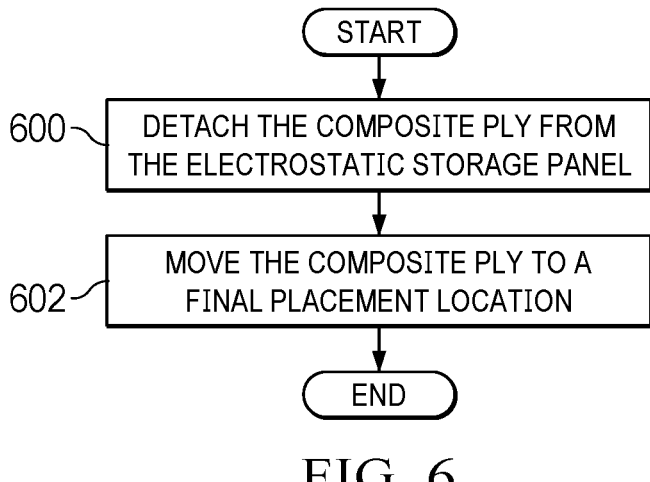
FIG. 6 is an illustration of a flowchart of a process for moving a composite ply to a final placement location in accordance with an illustrative embodiment.

With reference to FIG. 6, an illustration of a flowchart of a process for moving a composite ply to a final placement location is depicted in accordance with an illustrative embodiment. The operations in FIG. 6 are examples of additional operations that can be used with the operations in the process in FIG. 5.

The process begins by detaching the composite ply from the electrostatic storage panel (operation 600). The process moves the composite ply to a final placement location (operation 602). The process terminates thereafter.

Figure 7:
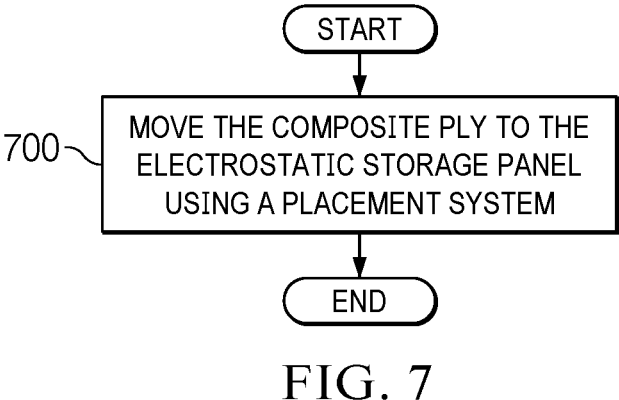
FIG. 7 is an illustration of a flowchart of a process for moving a composite ply to an electrostatic storage panel in accordance with an illustrative embodiment.

Turning to FIG. 7, an illustration of a flowchart of a process for moving a composite ply to an electrostatic storage panel is depicted in accordance with an illustrative embodiment. The process in FIG. 7 is an example of an implementation of operation 500 in FIG. 5. The process moves the composite ply to the electrostatic storage panel using a placement system (operation 700). The process terminates thereafter.

Figure 8:
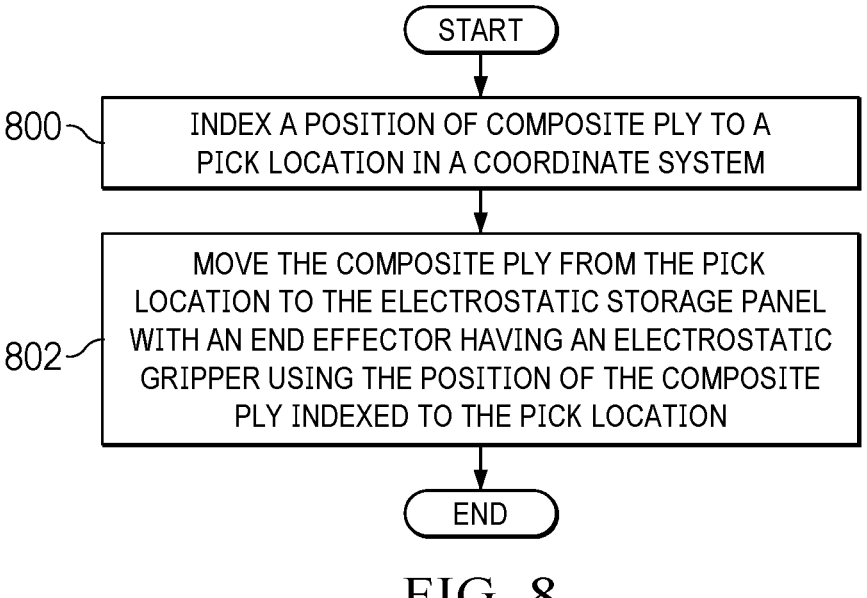
FIG. 8 is an illustration of a flowchart of a process for moving a composite ply to an electrostatic storage panel in accordance with an illustrative embodiment.

Turning next to FIG. 8, an illustration of a flowchart of a process for moving a composite ply to an electrostatic storage panel is depicted in accordance with an illustrative embodiment. The process in FIG. 8 is an example of an implementation of operation 500 in FIG. 5.

The process begins by indexing a position of composite ply to a pick location in a coordinate system (operation 800). The process moves the composite ply from the pick location to the electrostatic storage panel with an end effector having an electrostatic gripper using the position of the composite ply indexed to the pick location (operation 802). The process terminates thereafter.

Figure 9:
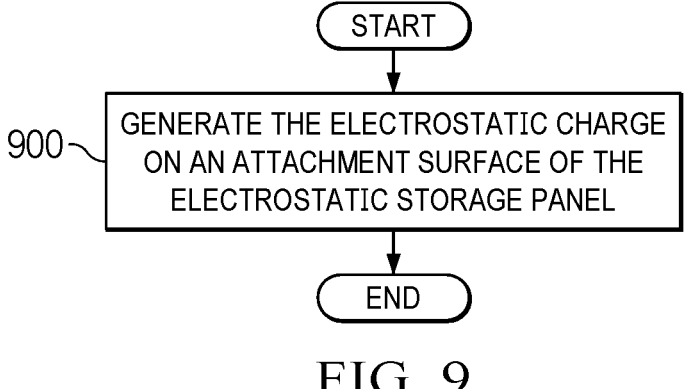
FIG. 9 is an illustration of a flowchart of a process for attaching a composite ply to an electrostatic storage panel in accordance with an illustrative embodiment.

With reference to FIG. 9, an illustration of a flowchart of a process for attaching a composite ply to an electrostatic storage panel is depicted in accordance with an illustrative embodiment. The process in FIG. 9 is an example of an implementation of operation 502 in FIG. 5.

The process generates the electrostatic charge on an attachment surface of the electrostatic storage panel (operation 900). The process terminates thereafter. In operation 900, the composite ply becomes attached to the attachment surface of the electrostatic storage panel in response to contacting the attachment surface.

Figure 10:
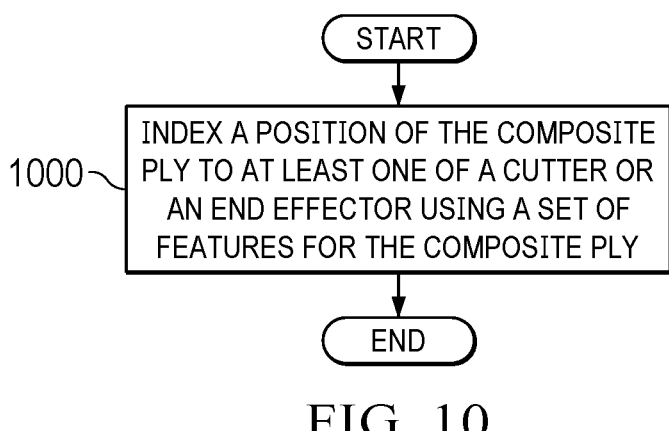
FIG. 10 is an illustration of a flowchart of a process for indexing a composite ply in accordance with an illustrative embodiment.

Turning to FIG. 10, an illustration of a flowchart of a process for indexing a composite ply is depicted in accordance with an illustrative embodiment. The operation in FIG. 10 is an example of an additional operation that can be used with the operations in the process in FIG. 5.

The process indexes a position of the composite ply to at least one of a cutter or an end effector using a set of features for the composite ply (operation 1000). The process terminates thereafter.

Figure 11:
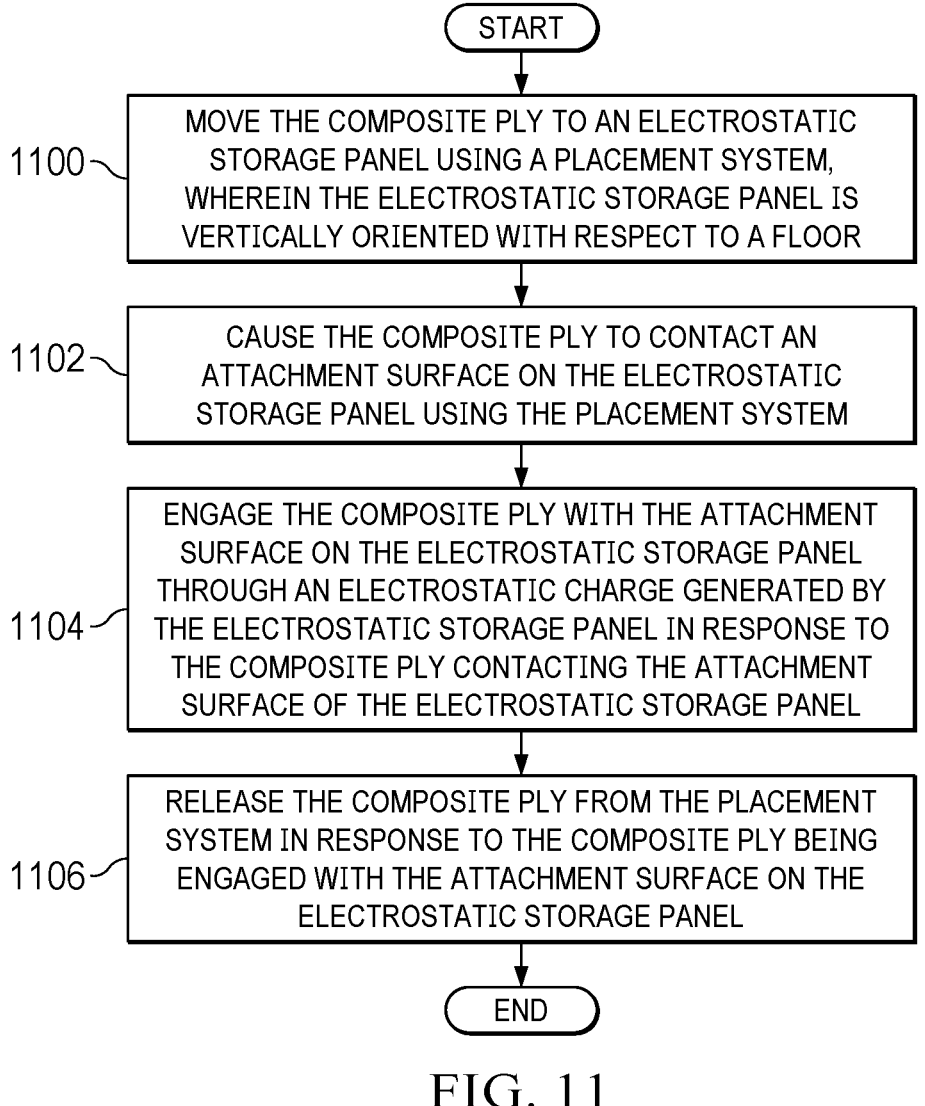
FIG. 11 is an illustration of a flowchart of a process for storing a composite ply in accordance with an illustrative embodiment.

Turning next to FIG. 11, an illustration of a flowchart of a process for storing a composite ply is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in controller 112 in computer system 110 in FIG. 1.

The process begins by moving the composite ply to an electrostatic storage panel using a placement system, wherein the electrostatic storage panel is vertically oriented with respect to a floor (operation 1100). The process causes the composite ply to contact an attachment surface on the electrostatic storage panel using the placement system (operation 1102).

The process engages the composite ply with the attachment surface on the electrostatic storage panel through an electrostatic charge generated by the electrostatic storage panel in response to the composite ply contacting the attachment surface of the electrostatic storage panel (operation 1104). The process releases the composite ply from the placement system in response to the composite ply being engaged with the attachment surface on the electrostatic storage panel (operation 1106). The process terminates thereafter.

Figure 12:
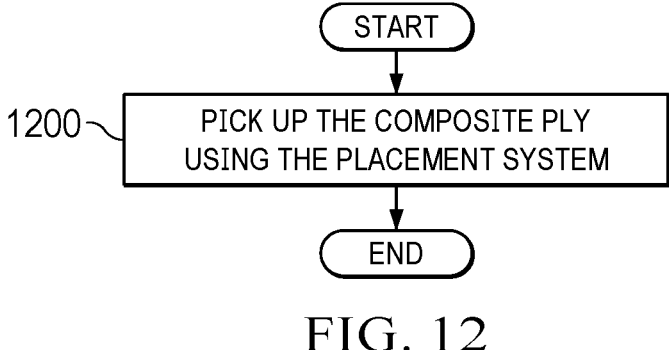
FIG. 12 is an illustration of a flowchart of a process for picking up a composite ply in accordance with an illustrative embodiment.

With reference to FIG. 12, an illustration of a flowchart of a process for picking up a composite ply is depicted in accordance with an illustrative embodiment. The operation in FIG. 12 is an additional operation that can be used with the operations in the process in FIG. 11. The process picks up the composite ply using the placement system (operation 1200). The process terminates thereafter.

Figure 13:
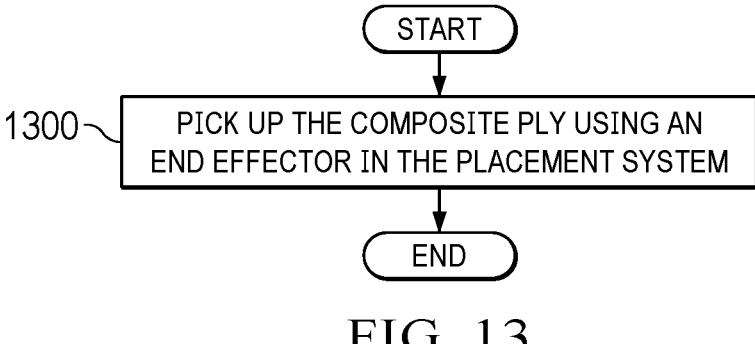
FIG. 13 is an illustration of a flowchart of a process for picking up a composite ply in accordance with an illustrative embodiment.

Turning to FIG. 13, an illustration of a flowchart of a process for picking up a composite ply is depicted in accordance with an illustrative embodiment. The process in FIG. 13 is an example of an implementation of operation 1200 in FIG. 12.

The process picks up the composite ply using an end effector in the placement system (operation 1300). The process terminates thereafter.

Turning next to FIG. 14, an illustration of a flowchart of a process for picking up a composite ply using a placement system is depicted in accordance with an illustrative embodiment. The process in FIG. 14 is an example of an implementation of operation 1200 in FIG. 12.

The process begins by moving an electrostatic end effector in the placement system to contact the composite ply (operation 1400). The process engages the composite ply with the electrostatic end effector while the composite ply is in contact with the electrostatic end effector (operation 1402). The process terminates thereafter.

With reference to FIG. 15, an illustration of a flowchart of a process for picking up a composite ply using a placement system is depicted in accordance with an illustrative embodiment. The process in FIG. 15 is an example of an implementation of operation 1200 in FIG. 12.

The process begins by identifying a current position of the composite ply using a sensor system (operation 1500). The process picks up the composite ply at the current position of the composite ply using the placement system (operation 1502). The process terminates thereafter.

Figure 16:
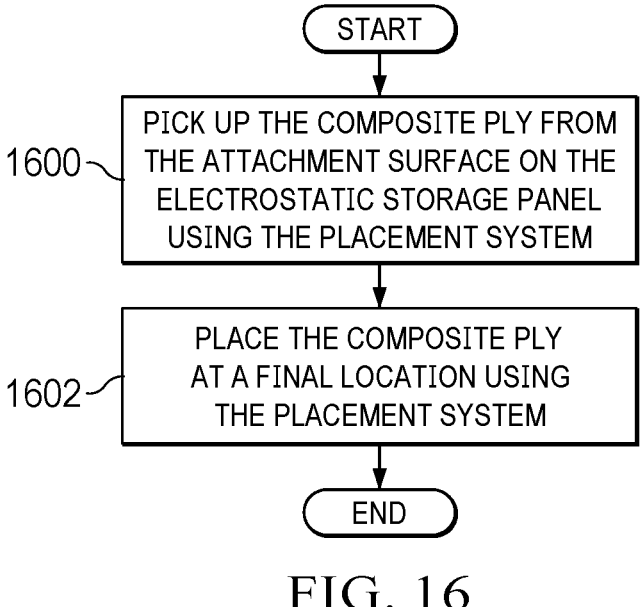
FIG. 16 is an illustration of a flowchart of a process for moving a composite ply to a final location in accordance with an illustrative embodiment.

Turning to FIG. 16, an illustration of a flowchart of a process for moving a composite ply to a final location is depicted in accordance with an illustrative embodiment. The operations in FIG. 16 are examples of additional operations that can be used with the operations in the process in FIG. 11.

The process begins by picking up the composite ply from the attachment surface on the electrostatic storage panel using the placement system (operation 1600). The process places the composite ply at a final location using the placement system (operation 1602). The process terminates thereafter.

Figure 17:
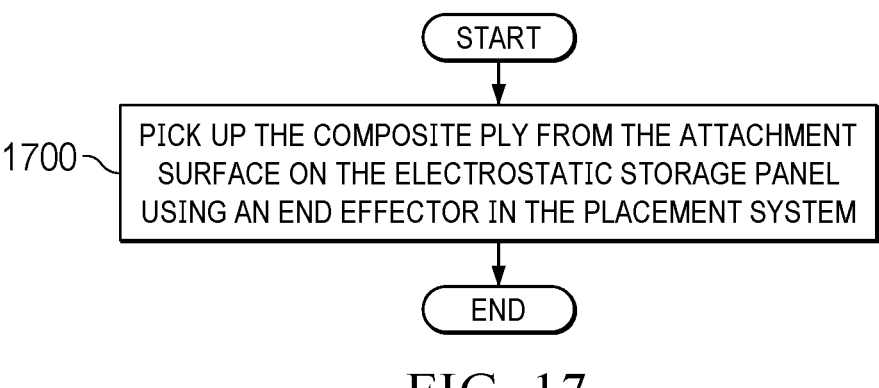
FIG. 17 is an illustration of a flowchart of a process for picking up a composite ply from an attachment surface in accordance with an illustrative embodiment.

Turning next to FIG. 17, an illustration of a flowchart of a process for picking up a composite ply from an attachment surface is depicted in accordance with an illustrative embodiment. The process in FIG. 17 is an example of an implementation of operation 1600 in FIG. 16. The process picks up the composite ply from the attachment surface on the electrostatic storage panel using an end effector in the placement system (operation 1700). The process terminates thereafter.

With reference to FIG. 18, an illustration of a flowchart of a process for picking up a composite ply from an attachment surface on an electrostatic storage panel is depicted in accordance with an illustrative embodiment. The process in FIG. 18 is an example of an implementation of operation 1600 in FIG. 16.

The process begins by moving an electrostatic end effector in the placement system to contact the composite ply (operation 1800). The process engages the composite ply with the electrostatic end effector (operation 1802). The process releases the composite ply from the attachment surface on the electrostatic storage panel (operation 1804). The process terminates thereafter.

Turning to FIG. 19, an illustration of a flowchart of a process for cutting a composite ply from a source material is depicted in accordance with an illustrative embodiment. The operation in FIG. 19 is an example of an additional operation that can be used with the operations in the process in FIG. 11. The process cuts the composite ply from a source material in an order relative to other composite plies that is in a cutting order that is different from a placement order for a composite part (operation 1900). The process terminates thereafter.

Figure 20:
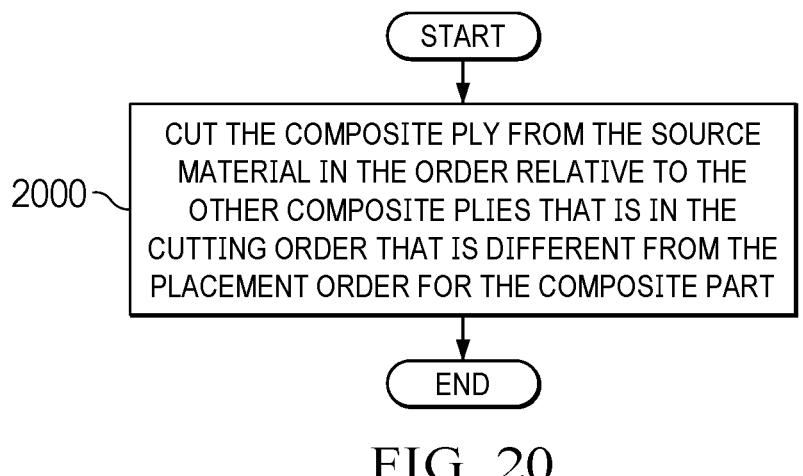
FIG. 20 is an illustration of a flowchart of a process for cutting a composite ply from a source material in accordance with an illustrative embodiment.
Figure 21:
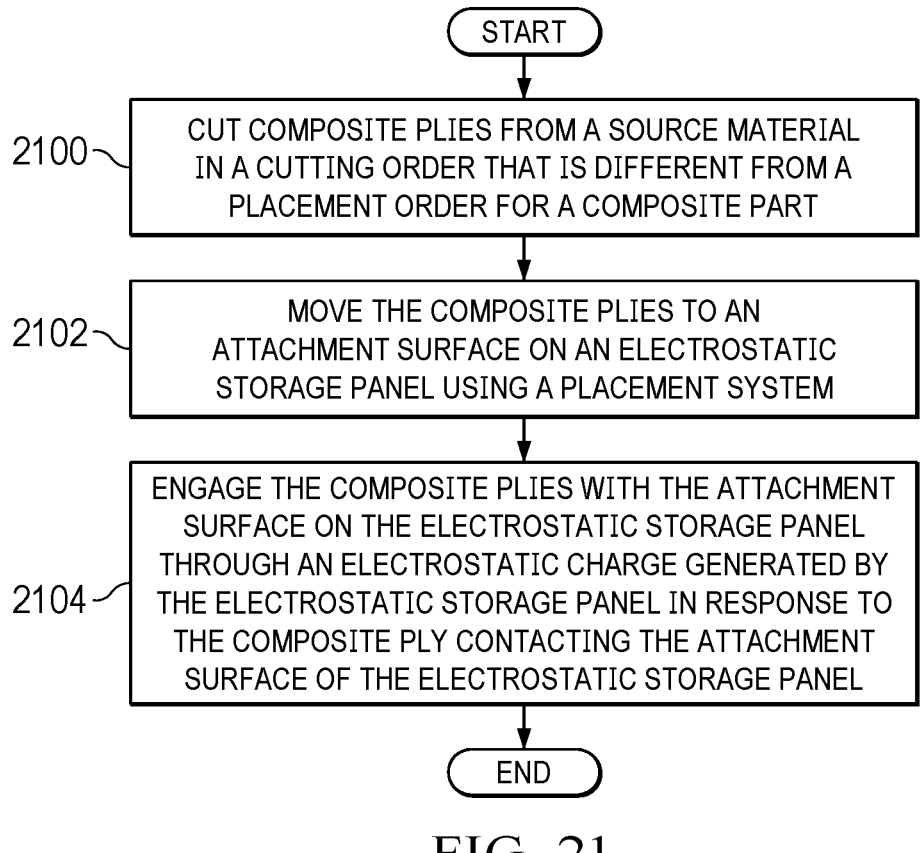
FIG. 21 is an illustration of a flowchart of a process for processing composite plies in accordance with an illustrative embodiment.

Turning next to FIG. 20, an illustration of a flowchart of a process for cutting a composite ply from a source material is depicted in accordance with an illustrative embodiment. The process in FIG. 20 is an example of an implementation of operation 1900 in FIG. 19. The process cuts the composite ply from the source material in the order relative to the other composite plies that is in the cutting order that is different from the placement order for the composite part (operation 2000). The process terminates thereafter. In operation 2000, the cutting order increases a usage of the source material as compared to cutting the composite plies using the placement order With reference to FIG. 21, an illustration of a flowchart of a process for processing composite plies is depicted in accordance with an illustrative embodiment. The process in FIG. 21 can be implemented in hardware, software, or both. When implemented in software, the process can take the form of program instructions that is run by one of more processor units located in one or more hardware devices in one or more computer systems. For example, the process can be implemented in controller 112 in computer system 110 in FIG. 1.

The process begins by cutting composite plies from a source material in a cutting order that is different from a placement order for a composite part (operation 2100). The process moves the composite plies to an attachment surface on an electrostatic storage panel using a placement system (operation 2102).

The process engages the composite plies with the attachment surface on the electrostatic storage panel through an electrostatic charge generated by the electrostatic storage panel in response to the composite plies contacting the attachment surface of the electrostatic storage panel (operation 2104). The process terminates thereafter.

Turning to FIG. 22, an illustration of a flowchart of a process for cutting composite plies from a source material is depicted in accordance with an illustrative embodiment. The process in FIG. 22 is an example of an implementation of operation 2100 in FIG. 21.

The process cuts the composite plies from the source material in the cutting order that is different from the placement order for the composite part that increases a usage of the source material as compared to cutting the composite plies using the placement order (operation 2200). The process terminates thereafter.

Turning next to FIG. 23, an illustration of a flowchart of a process for laying up composite plies on a tool is depicted in accordance with an illustrative embodiment. The operations in FIG. 23 are examples of additional operations that can be used with the operations in the process in FIG. 21.

The process begins by moving the composite plies from the electrostatic storage panel to a tool using the placement system (operation 2300). The process lays up the composite plies on the tool in the placement order for the composite part (operation 2302). The process terminates thereafter.

Figure 24:
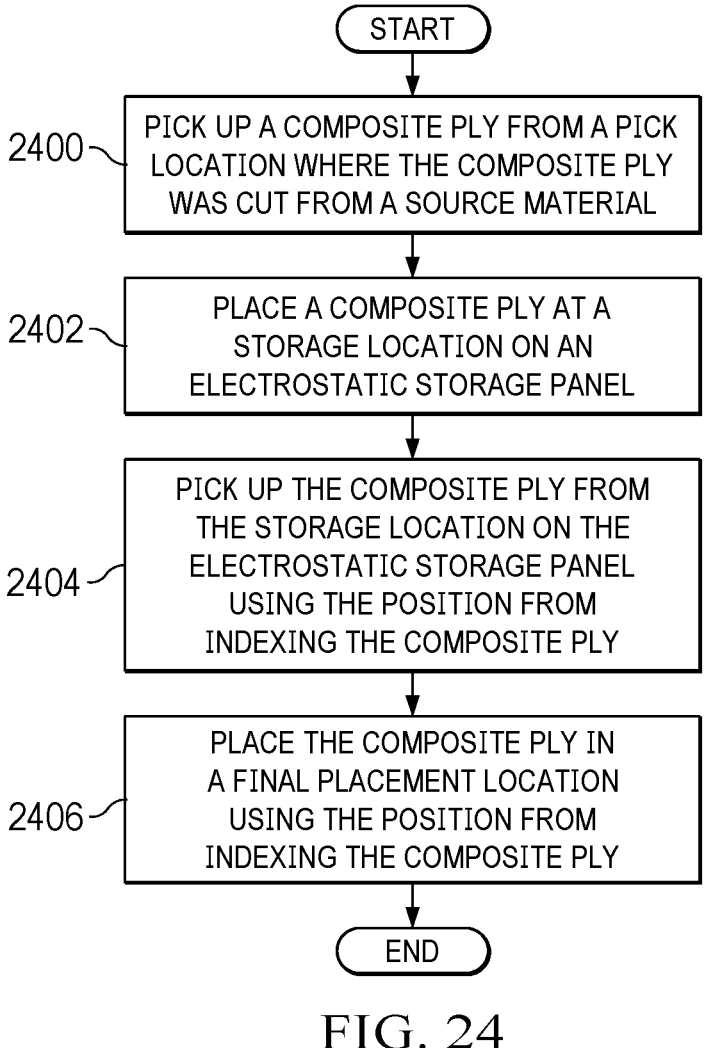
FIG. 24 is an illustration of a flowchart of a process for managing a composite ply in accordance with an illustrative embodiment.

Turning next to FIG. 24, an illustration of a flowchart of a process for managing a composite ply is depicted in accordance with an illustrative embodiment. The process in FIG. 24 can be implemented in hardware, software, or both. When implemented in software, the process can take the form of program instructions that is run by one of more processor units located in one or more hardware devices in one or more computer systems. For example, the process can be implemented in controller 112 in computer system 110 in FIG. 1.

The process begins by picking up a composite ply from a pick location where the composite ply was cut from a source material (operation 2400). The process places the composite ply at a storage location on an electrostatic storage panel using a placement system (operation 2402). The process indexes the composite ply at the storage location to identify a position of the composite ply at the storage location.

The process picks up the composite ply from the storage location on the electrostatic storage panel using the position from indexing the composite ply (operation 2404). The process places the composite ply in a final placement location using the position from indexing the composite ply (operation 2406). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 25:
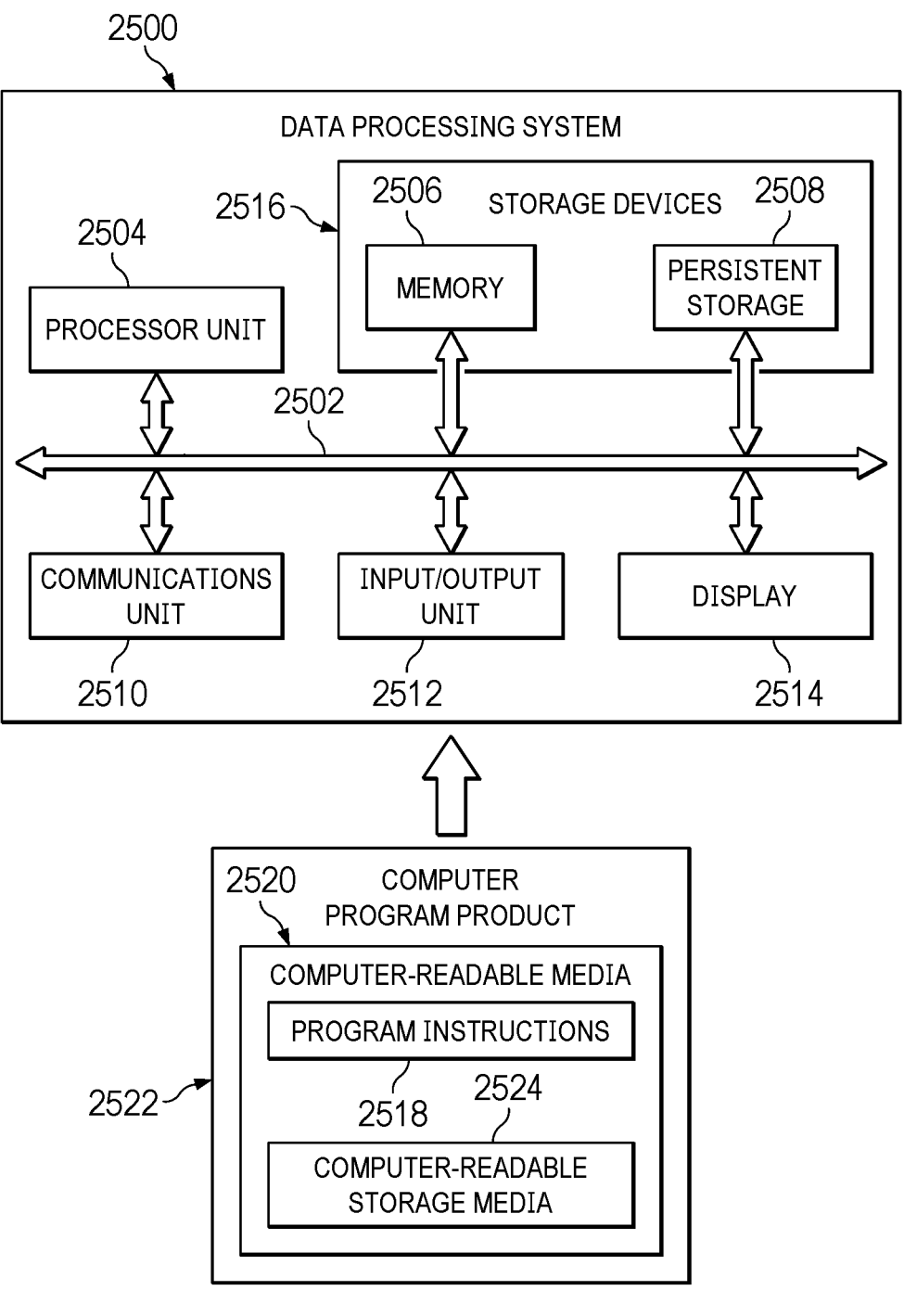
FIG. 25 is an illustration of a block diagram of a data processing system in accordance with an illustrative embodiment.

Turning now to FIG. 25, a block diagram of a data processing system is depicted in accordance with an illustrative embodiment. Data processing system 2500 can also be used to implement computer system 110 and can be implemented in automated manufacturing equipment 114 in FIG. 1. In this illustrative example, data processing system 2500 includes communications framework 2502, which provides communications between processor unit 2504, memory 2506, persistent storage 2508, communications unit 2510, input/output (I/O) unit 2512, and display 2514. In this example, communications framework 2502 takes the form of a bus system.

Processor unit 2504 serves to execute instructions for software that can be loaded into memory 2506. Processor unit 2504 includes one or more processors. For example, processor unit 2504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2504 can may be implemented using one or more heterogeneous processor systems in which a main processor is present with secondary processors on a single chip. As another illustrative example, processor unit 2504 can be a symmetric multi-processor system containing multiple processors of the same type on a single chip.

Memory 2506 and persistent storage 2508 are examples of storage devices 2516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2516 may also be referred to as computer readable storage devices in these illustrative examples. Memory 2506, in these examples, can be, for example, a random-access memory or any other suitable volatile or non-volatile storage device. Persistent storage 2508 may take various forms, depending on the particular implementation.

For example, persistent storage 2508 may contain one or more components or devices. For example, persistent storage 2508 can be a hard drive, a solid-state drive (SSD), a flash memory, a rewritable optical disk, a rewritable magnetic tape, or some combination of the above. The media used by persistent storage 2508 also can be removable. For example, a removable hard drive can be used for persistent storage 2508.

Communications unit 2510, in these illustrative examples, provides for communications with other data processing systems or devices. In these illustrative examples, communications unit 2510 is a network interface card.

Input/output unit 2512 allows for input and output of data with other devices that can be connected to data processing system 2500. For example, input/output unit 2512 may provide a connection for user input through at least one of a keyboard, a mouse, or some other suitable input device. Further, input/output unit 2512 may send output to a printer. Display 2514 provides a mechanism to display information to a user.

Instructions for at least one of the operating system, applications, or programs can be located in storage devices 2516, which are in communication with processor unit 2504 through communications framework 2502. The processes of the different embodiments can be performed by processor unit 2504 using computer-implemented instructions, which may be located in a memory, such as memory 2506.

These instructions are referred to as program instructions, computer usable program instructions, or computer readable program instructions that can be read and executed by a processor in processor unit 2504. The program instructions in the different embodiments can be embodied on different physical or computer readable storage media, such as memory 2506 or persistent storage 2508.

Program instructions 2518 is located in a functional form on computer readable media 2520 that is selectively removable and can be loaded onto or transferred to data processing system 2500 for execution by processor unit 2504. Program instructions 2518 and computer readable media 2520 form computer program product 2522 in these illustrative examples. In the illustrative example, computer readable media 2520 is computer readable storage media 2524.

Computer readable storage media 2524 is a physical or tangible storage device used to store program instructions 2518 rather than a medium that propagates or transmits program instructions 2518. Computer readable storage media 2524 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 2524, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 2518 can be transferred to data processing system 2500 using a computer readable signal media. The computer readable signal media are signals and can be, for example, a propagated data signal containing program instructions 2518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 2520" can be singular or plural. For example, program instructions 2518 can be located in computer readable media 2520 in the form of a single storage device or system. In another example, program instructions 2518 can be located in computer readable media 2520 that is distributed in multiple data processing systems. In other words, some instructions in program instructions 2518 can be located in one data processing system while other instructions in program instructions 2518 can be located in one data processing system. For example, a portion of program instructions 2518 can be located in computer readable media 2520 in a server computer while another portion of program instructions 2518 can be located in computer readable media 2520 located in a set of client computers.

The different components illustrated for data processing system 2500 are not meant to provide architectural limitations to the manner in which different embodiments can be implemented. In some illustrative examples, one or more of the components may be incorporated in or otherwise form a portion of, another component. For example, memory 2506, or portions thereof, may be incorporated in processor unit 2504 in some illustrative examples. The different illustrative embodiments can be implemented in a data processing system including components in addition to or in place of those illustrated for data processing system 2500. Other components shown in FIG. 25 can be varied from the illustrative examples shown. The different embodiments can be implemented using any hardware device or system capable of running program instructions 2518.

Figures 26, 27:
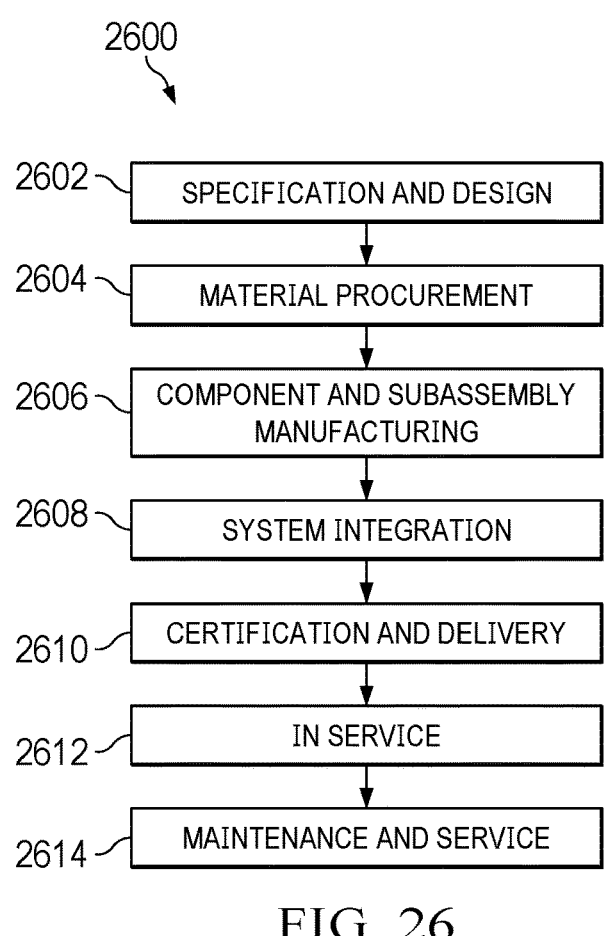
FIG. 26 is an illustration of an aircraft manufacturing and service method in accordance with an illustrative embodiment.
FIG. 27 is an illustration of a block diagram of an aircraft in which an illustrative embodiment may be implemented.

Illustrative embodiments of the disclosure may be described in the context of aircraft manufacturing and service method 2600 as shown in FIG. 26 and aircraft 2700 as shown in FIG. 26. Turning first to FIG. 26, an illustration of an aircraft manufacturing and service method is depicted in accordance with an illustrative embodiment. During preproduction, aircraft manufacturing and service method 2600 may include specification and design 2602 of aircraft 2700 in FIG. 27 and material procurement 2604.

During production, component and subassembly manufacturing 2606 and system integration 2608 of aircraft 2700 in FIG. 27 takes place. Thereafter, aircraft 2700 in FIG. 27 can go through certification and delivery 2610 in order to be placed in service 2612. While in service 2612 by a customer, aircraft 2700 in FIG. 27 is scheduled for routine maintenance and service 2614, which may include modification, reconfiguration, refurbishment, and other maintenance or service.

Each of the processes of aircraft manufacturing and service method 2600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 27, an illustration of an aircraft is depicted in which an illustrative embodiment may be implemented. In this example, aircraft 2700 is produced by aircraft manufacturing and service method 2600 in FIG. 26 and may include airframe 2702 with plurality of systems 2704 and interior 2706. Examples of systems 2704 include one or more of propulsion system 2708, electrical system 2710, hydraulic system 2712, and environmental system 2714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2600 in FIG. 26.

In one illustrative example, components or subassemblies produced in component and subassembly manufacturing 2606 in FIG. 26 can be fabricated or manufactured in a manner similar to components or subassemblies produced while aircraft 2600 is in service 2612 in FIG. 26. As yet another example, one or more apparatus embodiments, method embodiments, or a combination thereof can be utilized during production stages, such as component and subassembly manufacturing 2606 and system integration 2608 in FIG. 26. One or more apparatus embodiments, method embodiments, or a combination thereof may be utilized while aircraft 2700 is in service 2612, during maintenance and service 2614 in FIG. 26, or both. The use of a number of the different illustrative embodiments may substantially expedite the assembly of aircraft 2700, reduce the cost of aircraft 2700, or both expedite the assembly of aircraft 2700 and reduce the cost of aircraft 2700.

One or more illustrative examples can be implemented in at least one of component and subassembly manufacturing 2606 or and maintenance and service 2614. For example, composite plies can be cut and stored during component and subassembly manufacturing 2606 with the composite plies they are being used to manufacture a part for aircraft 2700. The amount of storage space using vertical oriented electrostatic storage panels can reduce the amount of space needed to store composite panels. As a result, amount of real estate can be reduced, reduce the cost for manufacturing facilities. In another illustrative example, similar savings can be achieved by storing composite part using electrostatic storage panels in vertical orientations for composite plies that are used to manufacture composite parts for user in routine maintenance and service 2614, which may include manufacturing composite parts for modification, reconfiguration, refurbishment, and other maintenance or service.

Additionally, composite plies can be cut in an order that increases the use of source materials reducing the amount of source material that is discarded as compared to current techniques in which composite plies are cut in in a placement order. In yet other illustrative examples, increased accuracy in the placement of composite parts can occur when composite plies are stored on electrostatic storage panels in vertical orientations. Reduced movement can occur with storing the composite plies on electrostatic storage panels as compared to using drawers because the electrostatic storage panels do not need to be opened and closed for storage. Further, the potential sliding or shifting of composite plies within a drawer that is opened and closed is also avoided through the use of vertically oriented electrostatic storage panels. As another example, issues with contaminants such as lubricants used for moving parts in current drawers for storage are avoided.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for storing a composite ply, the method comprising:
   moving, by an end effector having an electrostatic gripper, the composite ply to an electrostatic storage panel, wherein the electrostatic storage panel is vertically oriented in a composite part manufacturing system; and
   attaching the composite ply to the electrostatic storage panel using an electrostatic charge generated by the electrostatic storage panel.

2. The method of claim 1, wherein moving the composite ply to the electrostatic storage panel comprises:
   moving the composite ply to the electrostatic storage panel, wherein the composite ply is vertically oriented while attached to the electrostatic storage panel.

3. The method of claim 1 further comprising:
   detaching the composite ply from the electrostatic storage panel; and
   moving the composite ply to a final placement location.

4. The method of claim 3, wherein the final placement location is selected from one of a tool, a mandrel, a storage unit, and a prior placed composite ply for a laminate.

5. The method of claim 1, wherein moving the composite ply to the electrostatic storage panel comprises:
   moving the composite ply to the electrostatic storage panel using a placement system.

6. The method of claim 1, wherein moving the composite ply to the electrostatic storage panel comprises:
   indexing a position of composite ply to a pick location in in a coordinate system; and
   moving the composite ply from the pick location to the electrostatic storage panel with the end effector having the electrostatic gripper using the position of the composite ply indexed to the pick location.

7. The method of claim 1, wherein attaching the composite ply to the electrostatic storage panel using the electrostatic charge generated by the electrostatic storage panel further comprising:
   generating the electrostatic charge on an attachment surface of the electrostatic storage panel, wherein the composite ply becomes attached to the attachment surface of the electrostatic storage panel in response to contacting the attachment surface.

8. The method of claim 1 further comprising:
   indexing a position of the composite ply to at least one of a cutter or an end effector using a set of features for the composite ply.

9. A method for storing a composite ply, the method comprising:
   moving the composite ply to an electrostatic storage panel using a placement system comprising an end effector having an electrostatic gripper, wherein the electrostatic storage panel is vertically oriented in a composite part manufacturing system;
   causing the composite ply to contact an attachment surface on the electrostatic storage panel using the placement system;
   engaging the composite ply with the attachment surface on the electrostatic storage panel through an electrostatic charge generated by the electrostatic storage panel in response to the composite ply contacting the attachment surface of the electrostatic storage panel; and
   releasing the composite ply from the placement system in response to the composite ply being engaged with the attachment surface on the electrostatic storage panel.

10. A method of processing composite plies, the method comprising:
   cutting composite plies from a source material in a cutting order that is different from a placement order for a composite part;
   moving the composite plies to an attachment surface on an electrostatic storage panel using a placement system; and
   engaging the composite plies with the attachment surface on the electrostatic storage panel through an electrostatic charge generated by the electrostatic storage panel in response to the composite ply contacting the attachment surface of the electrostatic storage panel.

11. A composite manufacturing system comprising:
   electrostatic storage panel, wherein the electrostatic storage panel is vertically oriented in the composite part manufacturing system;
   a placement system comprising an end effector having an electrostatic gripper;
   a controller configured to:
   pick up the composite ply using the placement system;
   move the composite ply to the electrostatic storage panel using the placement system;
   cause the composite ply to contact an attachment surface on the electrostatic storage panel using the placement system;
   engage the composite ply with the attachment surface on the electrostatic storage panel through an electrostatic charge generated by the electrostatic storage panel in response to the composite ply contacting the attachment surface of the electrostatic storage panel; and
   release the composite ply from the placement system in response to the composite ply being engaged with the attachment surface on the electrostatic storage panel.

12. The composite manufacturing system of claim 11, wherein the electrostatic storage panel is vertically oriented with respect to a floor in the composite manufacturing system.

13. The composite manufacturing system of claim 11, wherein the placement system picks up the composite ply using the end effector in the placement system.

14. The composite manufacturing system of claim 13, in picking up the composite ply using the placement system, the controller is configured to:

move the electrostatic end effector in the placement system to contact the composite ply; and engage the composite ply with the electrostatic end effector while the composite ply is in contact with the electrostatic end effector.

15. The composite manufacturing system of claim 11, wherein the controller is configured to:

pick up the composite ply from the attachment surface on the electrostatic storage panel using the placement system; and place the composite ply at a final location using the placement system.

16. The composite manufacturing system of claim 15, wherein the final location is selected from one of a tool, a mandrel, a storage unit, and a prior placed composite ply for a laminate.

17. The composite manufacturing system of claim 15, wherein in picking up the composite ply from the attachment surface on the electrostatic storage panel using the placement system, the controller is configured to:

pick up the composite ply from the attachment surface on the electrostatic storage panel using the end effector in the placement system.

18. The composite manufacturing system claim 11 further comprising:

a cutting machine, wherein the controller controls is configured to control the cutting machine to:

cut the composite ply from a source material in an order relative to other composite plies that is in a cutting order that is different from a placement order for a composite part.

19. The composite manufacturing system of claim 18, wherein in cutting the composite ply from the source material in the order relative to the other composite plies that is in the cutting order that is different from the placement order for the composite part, the controller is configured to control the cutting machine to:

cut the composite ply from the source material in the order relative to the other composite plies that is in the cutting order that is different from the placement order for the composite part, wherein the cutting order increases a usage of the source material as compared to cutting the composite plies using the placement order.

20. The composite manufacturing system of claim 18, wherein in cutting the composite plies from the source material in the order that is out order for the placement order for the composite part, the controller is configured to control the cutting machine to:

cut the composite plies from the source material in the cutting order that is different from the placement order for the composite part that increases a usage of the source material as compared to cutting the composite plies using the placement order.

21. A method for managing composite plies, the method comprising:

picking up a composite ply from a pick location where the composite ply was cut from a source material;

placing the composite ply at a storage location on an electrostatic storage panel using a placement system comprising an end effector having an electrostatic gripper, wherein the electrostatic storage panel is vertically oriented; and indexing the composite ply at the storage location to identify a position of the composite ply at the storage location.

22. The method of claim 21 further comprising:

picking up the composite ply from the storage location on the electrostatic storage panel using the position from indexing the composite ply; and placing the composite ply in a final placement location using the position from indexing the composite ply.

23. The method of claim 21 further comprising:

cutting the composite ply from the source material in a cutting order that is different from placement order for the composite ply, wherein the composite ply is cut out of sequence from other composite plies.

24. The method of claim 23 wherein cutting the composite ply from the source material in a cutting order that is different from placement order for the composite ply comprises cutting the composite ply from the source material in a cutting order that is different from placement order for the composite ply, wherein the composite ply is cut out of sequence from other composite plies and the composite ply is nested with other composite plies such that increased use of the source material occurs.

25. A method for managing composite plies, the method comprising:

picking up, by an end effector having an electrostatic gripper, a composite ply from a storage location on an electrostatic storage panel using a position of the composite ply at the storage location, wherein the position is from indexing the composite ply at the storage location, wherein the electrostatic storage panel is vertically oriented; and placing the composite ply in a final placement location using the position from indexing the composite ply.

* * * * *